US012668736B1

(12) United States Patent
Yaseri et al.

(10) Patent No.: US 12,668,736 B1
(45) Date of Patent: Jun. 30, 2026

(54) METHOD OF CONCURRENT OIL EXTRACTION AND CARBON DIOXIDE MINERALIZATION

(71) Applicant: King Fahd University of Petroleum and Minerals, Dhahran (SA)

(72) Inventors: Ahmed Zarzor Hussien Yaseri, Dhahran (SA); Ibrahim Yahia Yaagoob Mohamed, Dhahran (SA); Noof Saleh Aqeel Al-Aqeel, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 19/399,956

(22) Filed: Nov. 25, 2025

(51) Int. Cl.
*C09K 8/594* (2006.01)

(52) U.S. Cl.
CPC .................................... *C09K 8/594* (2013.01)

(58) Field of Classification Search
CPC ........................................................ C09K 8/00
See application file for complete search history.

(56) References Cited

U.S. PATENT DOCUMENTS 5,018,577 A * 5/1991 Pardue .................... C07F 9/301
507/927
2015/0252250 A1* 9/2015 Levey .................... C09K 8/882
507/224

2023/0313645 A1* 10/2023 Al-Qasim .......... E21B 41/0064
166/250.01
2025/0235847 A1 7/2025 Jang et al.

FOREIGN PATENT DOCUMENTS

KR 10-2025-0035702 A 3/2025
WO WO 2014/205163 A1 12/2014
WO WO 2024/197095 A2 9/2024
WO WO 2024/218256 A1 10/2024

OTHER PUBLICATIONS

Bikash K. Mondal, et al., "Kinetics of CO2 absorption in aqueous hexamethylenediamine", International Journal of Greenhouse Gas Control, vol. 56, Jan. 2017, pp. 116-125.
Ernest Ansah Owusu, et al., "Carbon Mineralization in Basaltic Rocks: Mechanisms, Applications, and Prospects for Permanent CO2 Sequestration", Energies 2025, vol. 18, Issue 13, 3489, Jul. 2, 2025, 22 pages.
Leon Segal, "The Reaction Product of Hexamethylenediamine and Carbon Dioxide", Applied Spectroscopy, vol. 17, Issue 1, pp. 21-22 (1963), Abstract only, 3 pages.

* cited by examiner

*Primary Examiner* — William D Hutton, Jr.
*Assistant Examiner* — Avi T Skaist
(74) *Attorney, Agent, or Firm* — Oblon, McClelland, Maier & Neustadt, L.L.P.

(57) ABSTRACT

A method of concurrent oil extraction and carbon dioxide ($CO_2$) mineralization includes treating a subterranean rock with hexamethylenediamine-containing solution to improve $CO_2$ uptake and oil recovery rate.

20 Claims, 26 Drawing Sheets

FIG. 2

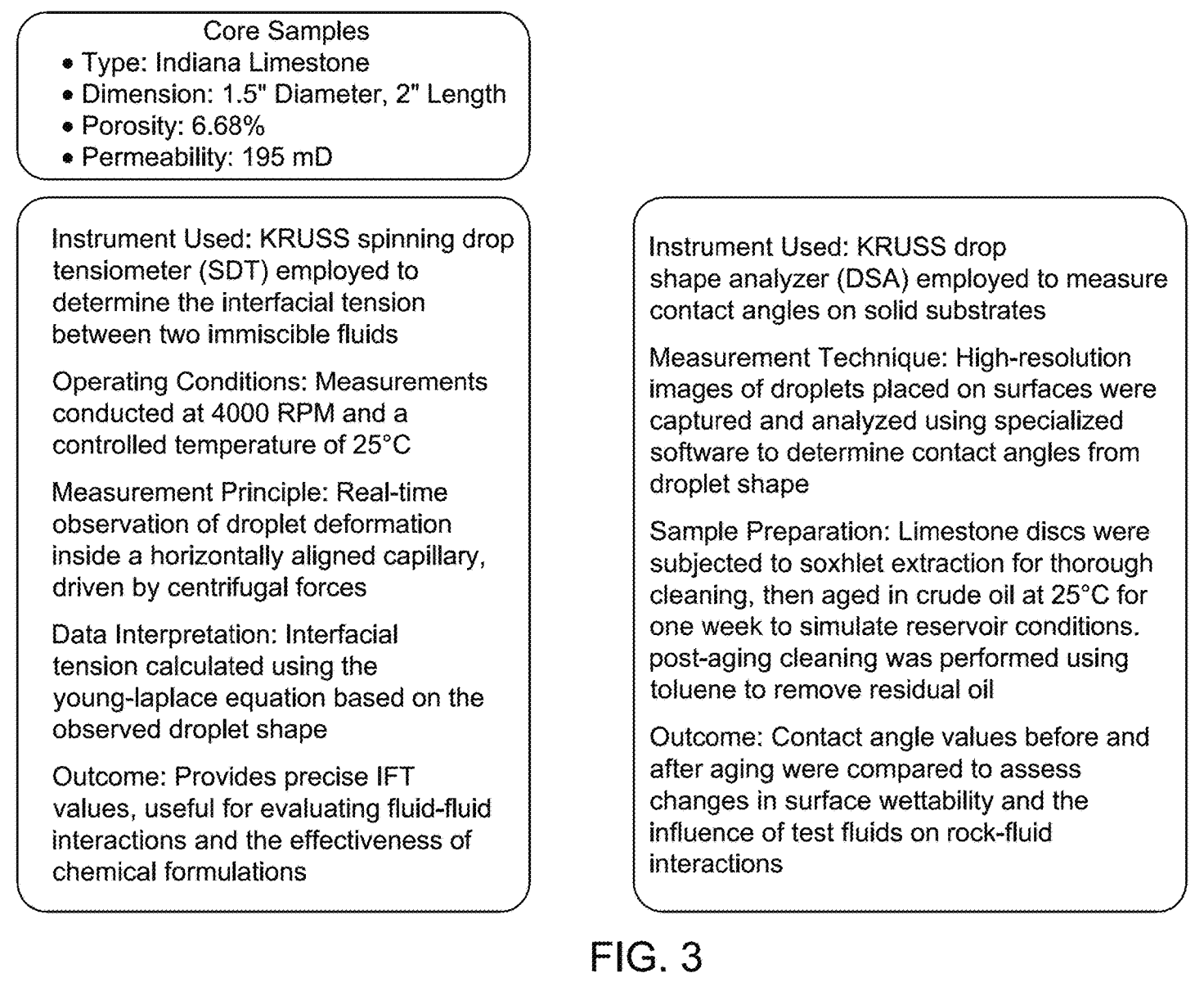

Core Samples
- Type: Indiana Limestone
- Dimension: 1.5" Diameter, 2" Length
- Porosity: 6.68%
- Permeability: 195 mD Instrument Used: KRUSS spinning drop tensiometer (SDT) employed to determine the interfacial tension between two immiscible fluids Operating Conditions: Measurements conducted at 4000 RPM and a controlled temperature of 25°C Measurement Principle: Real-time observation of droplet deformation inside a horizontally aligned capillary, driven by centrifugal forces Data Interpretation: Interfacial tension calculated using the young-laplace equation based on the observed droplet shape Outcome: Provides precise IFT values, useful for evaluating fluid-fluid interactions and the effectiveness of chemical formulations Instrument Used: KRUSS drop shape analyzer (DSA) employed to measure contact angles on solid substrates Measurement Technique: High-resolution images of droplets placed on surfaces were captured and analyzed using specialized software to determine contact angles from droplet shape Sample Preparation: Limestone discs were subjected to soxhlet extraction for thorough cleaning, then aged in crude oil at 25°C for one week to simulate reservoir conditions. post-aging cleaning was performed using toluene to remove residual oil Outcome: Contact angle values before and after aging were compared to assess changes in surface wettability and the influence of test fluids on rock-fluid interactions

FIG. 3

Figure 3:
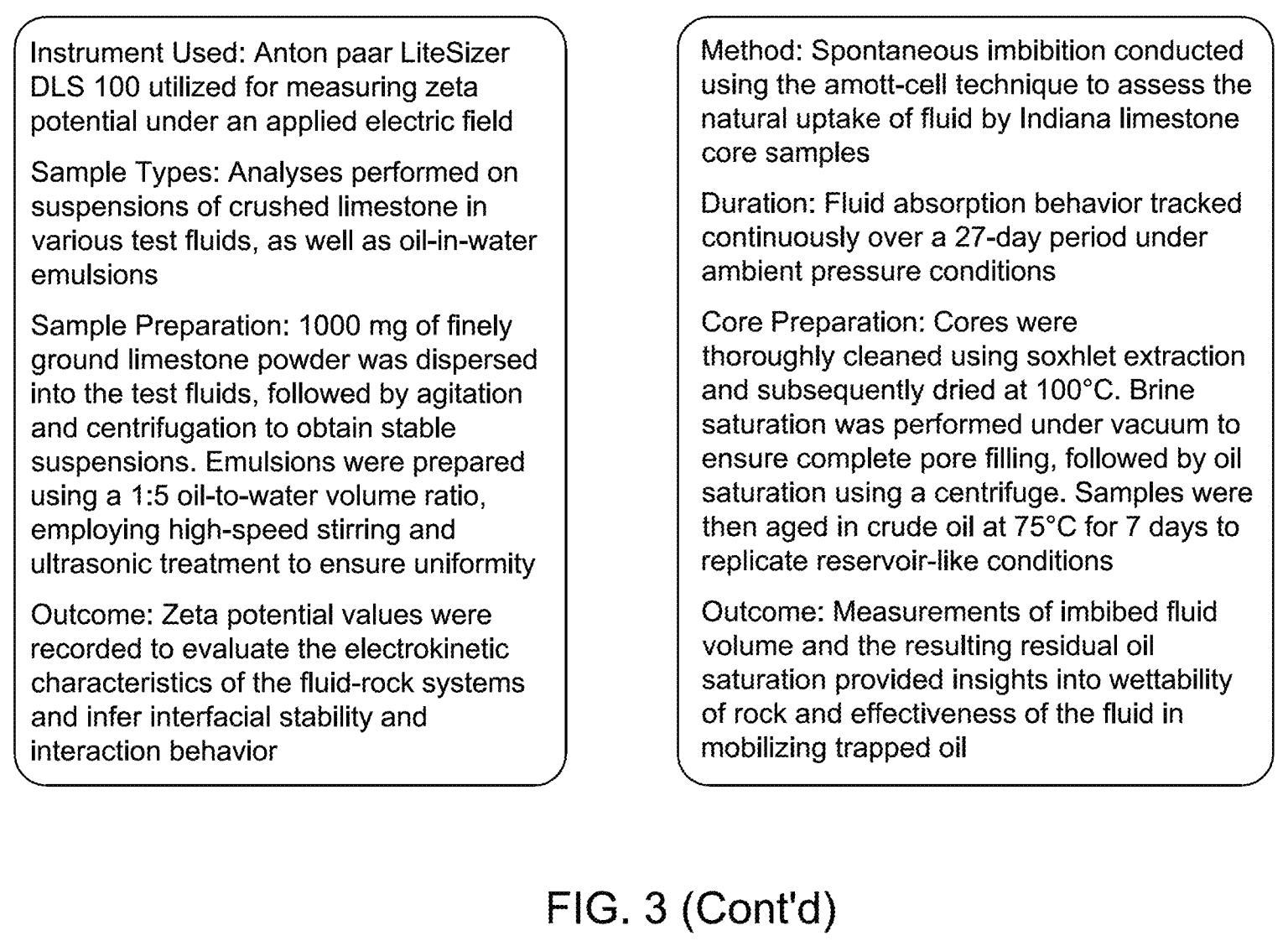

Method: Spontaneous imbibition conducted using the amott-cell technique to assess the natural uptake of fluid by Indiana limestone core samples Duration: Fluid absorption behavior tracked continuously over a 27-day period under ambient pressure conditions Core Preparation: Cores were thoroughly cleaned using soxhlet extraction and subsequently dried at 100°C. Brine saturation was performed under vacuum to ensure complete pore filling, followed by oil saturation using a centrifuge. Samples were then aged in crude oil at 75°C for 7 days to replicate reservoir-like conditions Outcome: Measurements of imbibed fluid volume and the resulting residual oil saturation provided insights into wettability of rock and effectiveness of the fluid in mobilizing trapped oil Instrument Used: Anton paar LiteSizer DLS 100 utilized for measuring zeta potential under an applied electric field Sample Types: Analyses performed on suspensions of crushed limestone in various test fluids, as well as oil-in-water emulsions Sample Preparation: 1000 mg of finely ground limestone powder was dispersed into the test fluids, followed by agitation and centrifugation to obtain stable suspensions. Emulsions were prepared using a 1:5 oil-to-water volume ratio, employing high-speed stirring and ultrasonic treatment to ensure uniformity Outcome: Zeta potential values were recorded to evaluate the electrokinetic characteristics of the fluid-rock systems and infer interfacial stability and interaction behavior

METHOD OF CONCURRENT OIL EXTRACTION AND CARBON DIOXIDE MINERALIZATION

STATEMENT OF ACKNOWLEDGEMENT

Support provided by the King Fahd University of Petroleum and Minerals (KFUPM), Saudi Arabia is gratefully acknowledged.

BACKGROUND

Technical Field

The present disclosure is directed towards a method of concurrent oil extraction and carbon dioxide ($CO_2$) mineralization, and more particularly towards a method of concurrent oil extraction and $CO_2$ mineralization using hexamethylenediamine (HMDA)-containing solution to treat the wellbore.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

The global pursuit of decarbonization has driven the development of technologies aimed at simultaneously mitigating anthropogenic carbon dioxide ($CO_2$) emissions and enhancing hydrocarbon recovery from mature reservoirs. However, multiple limitations continue to restrict the large-scale deployment and efficiency of existing carbon management and EOR strategies. Conventional geological $CO_2$ storage approaches depend heavily on the integrity of subsurface formations, raising long-term concerns related to leakage, monitoring, and storage permanence. Similarly, traditional EOR operations often suffer from high costs, excessive water consumption, and limited compatibility between injection fluids and reservoir rock types, particularly in carbonate formations. $CO_2$ mineralization has emerged as a promising alternative for permanent sequestration, where gaseous $CO_2$ reacts with metal oxides or silicate-bearing materials to form stable carbonates such as calcite, magnesite, or siderite. This process effectively immobilizes $CO_2$ and eliminates leakage risks. Nevertheless, natural mineralization is inherently slow, while engineered mineralization techniques face challenges associated with energy intensity, slow reaction kinetics, and the scalability of industrial implementation. Additionally, integrating $CO_2$ mineralization into subsurface energy systems remains a developing field, with limited understanding of how such processes can influence or enhance reservoir performance.

Water-based EOR techniques, especially smart water flooding, have gained attention as a cost-effective and environmentally sustainable approach for improving oil recovery. By modifying the ionic composition of the injection brine, smart water can alter key interfacial properties such as wettability, interfacial tension, and rock-fluid interactions. However, the mechanisms governing these alterations remain complex and highly dependent on the brine composition, reservoir mineralogy, and environmental conditions. A persistent challenge lies in developing injection fluids both chemically compatible with the reservoir and capable of sustaining favorable interfacial interactions without causing formation damage, precipitation, or scaling.

Therefore, several key challenges remain unresolved, including the need for improved understanding of chemical-interfacial coupling mechanisms, development of compatible injection fluids, and evaluation of their long-term impacts on reservoir systems. Addressing these limitations is essential to realizing the dual goals of sustainable carbon management and efficient resource recovery.

Accordingly, it is one object of the present disclosure to provide a of concurrent oil extraction and carbon dioxide ($CO_2$) mineralization that exhibits enhanced stability, high activity, and effective resistance to deactivation, without compromising the scalability and economic viability.

SUMMARY

In an exemplary embodiment, a method of concurrent oil extraction and carbon dioxide ($CO_2$) mineralization is described. The method includes injecting a solution including seawater and hexamethylenediamine (HMDA) into a wellbore bored in an underground geological formation including basalt rocks, where HMDA is present in the solution at a weight percentage of 0.1 to 1.0 wt. % based on a total weight of the solution, flowing a $CO_2$-containing gas into the solution to form a carbonated solution submerged in the underground geological formation, where the $CO_2$-containing gas includes mainly $CO_2$, and injecting a basic solution into the carbonated solution to precipitate a plurality of carbonate minerals and form a treated water. The basic solution includes sodium hydroxide at a weight percentage of 1 to 2 wt. % based on a total weight of the basic solution. The carbonate minerals include calcite and halite and are in the form of particles. The method further includes flooding the underground geological formation with the water treated under ambient pressure, where the underground geological formation further includes crude oil, thereby extracting the crude oil from the underground geological formation.

In some embodiments, the seawater includes a total dissolved solid at a concentration of 50,000 to 80,000 ppm and a plurality of ions including sodium ions ($Na^+$) at a concentration of 15,000 to 25,000 ppm, calcium ions ($Ca^{2+}$) at a concentration of 500 to 1,500 ppm, magnesium ions ($Mg^{2+}$) at a concentration of 2,000 to 4,000 ppm, sulfate ions ($SO_4^{2-}$) at a concentration of 2,000 to 5,000 ppm, chloride ions ($Cl^-$) at a concentration of 30,000 to 50,000 ppm and bicarbonate ions ($HCO_3^-$) at a concentration of 100 to 500 ppm.

In some embodiments, HMDA is present in the solution at a weight percentage of 0.1 to 0.5 wt. % based on the total weight of the solution.

In some embodiments, the carbonated solution includes a total inorganic carbon at an amount of 1000 to 1500 mg/L, and the carbonated solution uptakes $CO_2$ at an amount of 4.0 to 5.0 g/L.

In some embodiments, the carbonate minerals are precipitated at a weight of 10 to 15 grams per 1 liter of the carbonated solution including calcite, at a weight percentage of 45 to 65 wt. % and halite at a weight percentage of 50 to 60 wt. % based on the total weight percentage of the carbonate minerals. The carbonate minerals include porous globular aggregates having an irregular shape and a particle size of 2 to 10 μm.

In some embodiments, the treated water exhibits a zeta potential over a limestone rock of −5 to −1 mV, a zeta potential over oil of −30 to −25 mV and an interfacial tension of 6.0 to 6.5 mN/m.

In some embodiments, the submerging of the underground geological formation in the treated water forms an aged underground geological formation having a water contact angle of 15° to 20°.

In some embodiments, an oil recovery rate of 45 to 50% after 20 to 30 days.

In some embodiments, HDMA is present in the solution at a weight percentage of 0.5 to 0.7 wt. % based on the total weight of the solution.

In some embodiments, the carbonated solution includes a total inorganic carbon at an amount of 1500 to 2000 mg/L, and the carbonated solution uptakes $CO_2$ at an amount of 7.0 to 8.0 g/L.

In some embodiments, the carbonate minerals are precipitated at a weight of 15 to 20 grams per 1 liter of the carbonated solution including halite at a weight percentage of 85 to 99 wt. % and calcite at a weight percentage of 1 to 5 wt. % based on the total weight percentage of the carbonate minerals. Carbonate minerals include a faceted and angular morphology having a layered structure. The particles have a bimodal size distribution with a particle size of 10 to 20 μm.

In some embodiments, the treated water exhibits a zeta potential over a limestone rock of −6.0 to −5.0 mV, a zeta potential over oil of −15 to −10 mV and an interfacial tension of 4.5 to 6.0 mN/m.

In some embodiments, the submerging of the underground geological formation in the treated water forms an aged underground geological formation having a water contact angle of 25° to 35°.

In some embodiments, an oil recovery rate of 45 to 50% after 20 to 30 days.

In some embodiments, HMDA is present in the solution at a weight percentage of 0.7 to 1.0 wt. % based on the total weight of the solution.

In some embodiments, the carbonated solution includes a total inorganic carbon at an amount of 3000 to 4000 mg/L, and the carbonated solution uptakes $CO_2$ at an amount of 10 to 15 g/L.

In some embodiments, the carbonate minerals are precipitated at a weight of 7.0 to 10.0 grams per 1 liter of the carbonated solution including halite at a weight percentage of 75 to 95 wt. % and calcite at a weight percentage of 10 to 15 wt. % based on the total weight percentage of the carbonate minerals. The carbonate minerals include a plurality of amorphous particles having a particle size of 15 to 50 μm.

In some embodiments, the treated water exhibits a zeta potential over a limestone rock of −0.5 to −0.1 mV, a zeta potential over oil of −10 to −5 mV and an interfacial tension of 3.5 to 5.0 mN/m.

In some embodiments, the submerging of the underground geological formation in the treated water forms an aged underground geological formation having a water contact angle of 40° to 50°.

In some embodiments, an oil recovery rate of 35 to 40% after 20 to 30 days.

BRIEF DESCRIPTION OF THE DRAWINGS

A more complete appreciation of this disclosure and many of the attendant advantages thereof will be readily obtained as the same becomes better understood by reference to the

Figure 1:
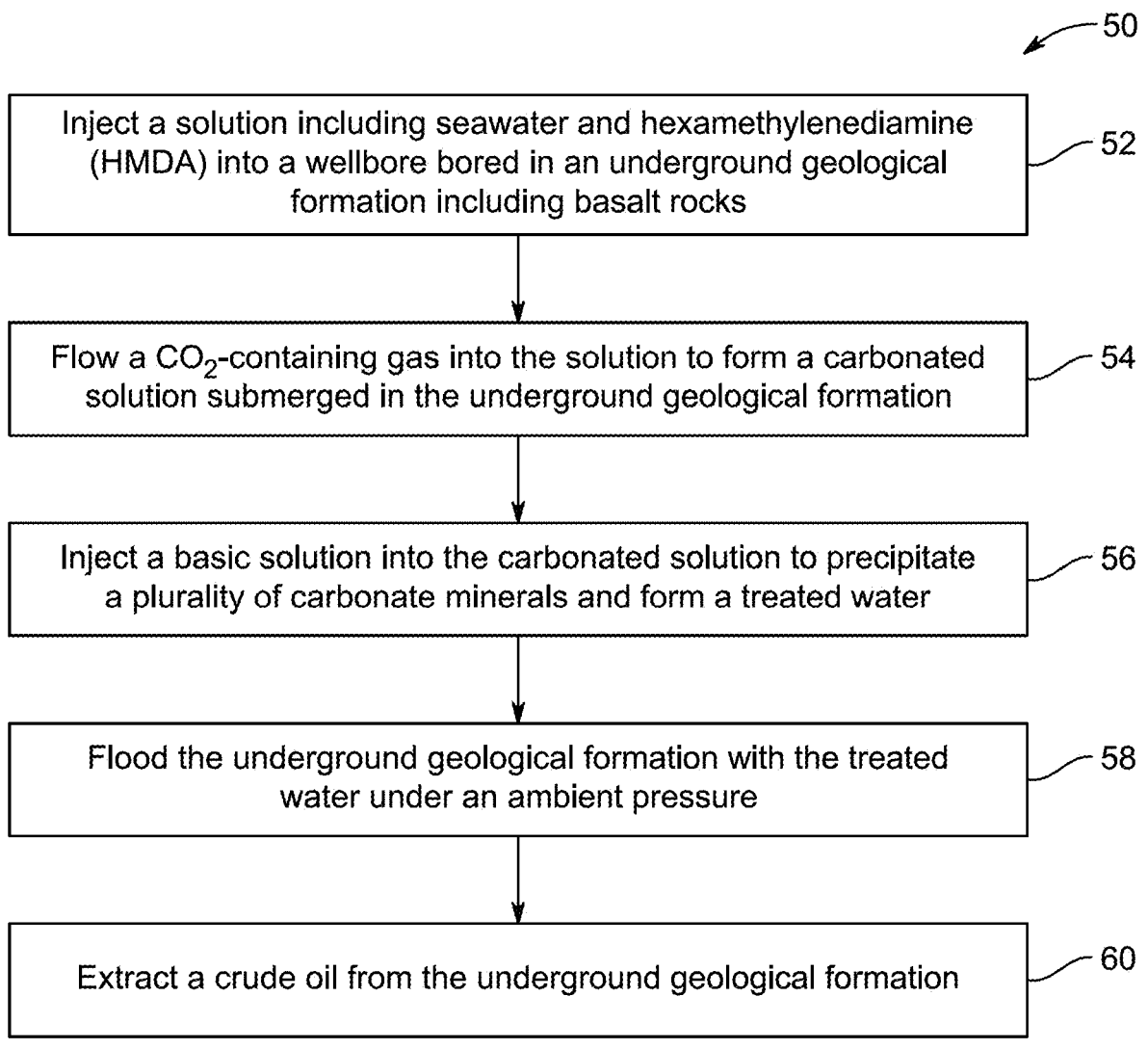

4 following detailed description when considered in connection with the accompanying drawings, wherein:

FIG. 1 is an exemplary flowchart of a method of concurrent oil extraction and carbon dioxide ($CO_2$) mineralization, according to certain embodiments.

Figure 2:
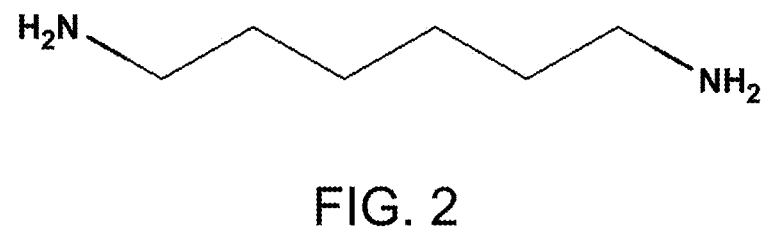

FIG. 2 shows the chemical structure of hexamethylenediamine (HMDA), according to certain embodiments.

FIG. 3 is a flow diagram summarizing the experimental procedures and outcomes, according to certain embodiments.

Figure 4:
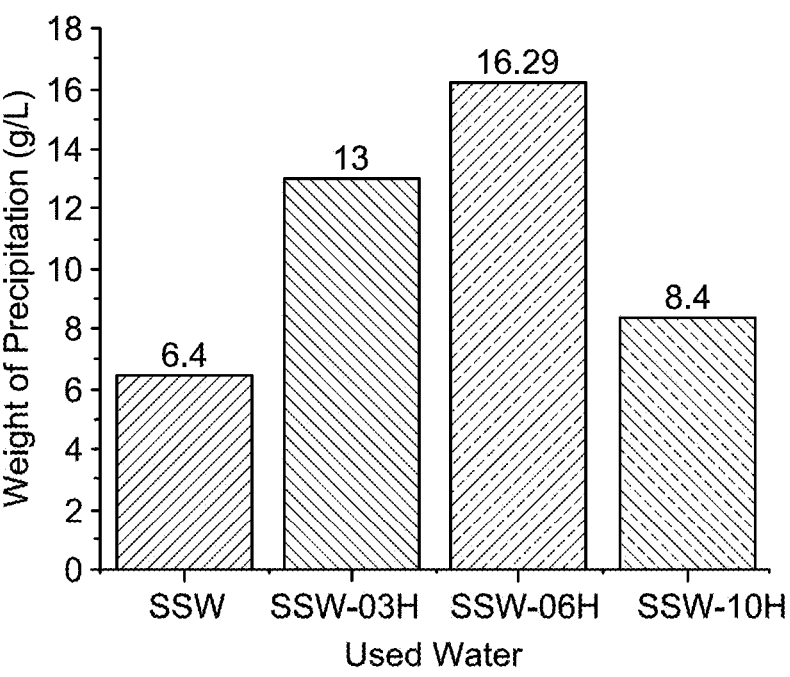

FIG. 4 is a bar graph comparing the weight of precipitated carbonate minerals obtained from injecting a seawater (SSW), a seawater solution with 0.3 wt. % HMDA and concurrent $CO_2$ sequestration with 1.2 wt. % NaOH solution (SSW-03H), a seawater solution with 0.6 wt. % HMDA and concurrent $CO_2$ sequestration with 1.2 wt. % NaOH solution (SSW-06H), and a seawater solution with 1.0 wt. % HMDA and concurrent $CO_2$ sequestration with 1.2 wt. % NaOH solution (SSW-10H), according to certain embodiments.

Figure 5:
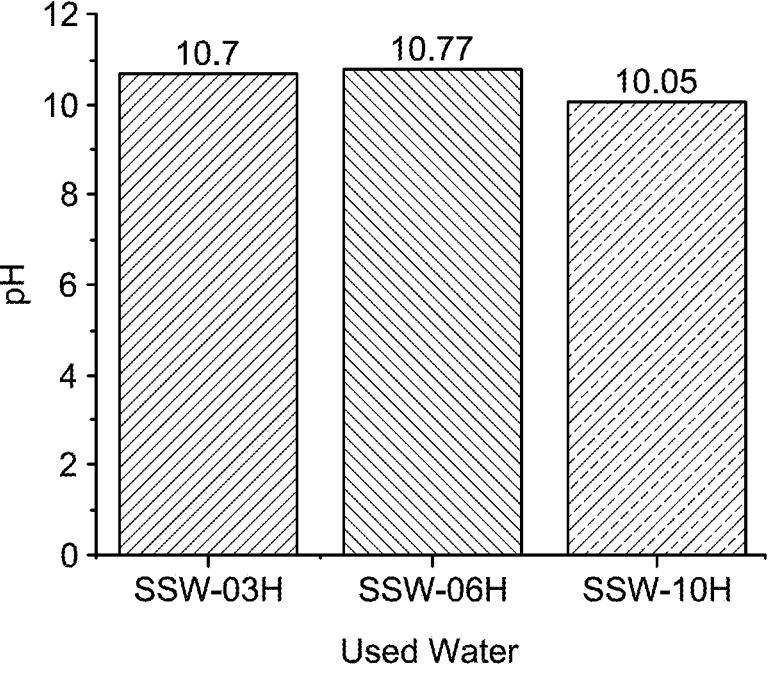

FIG. 5 is a bar graph showing a pH value of SSW-03H, SSW-06H and SSW-10H, according to certain embodiments.

Figure 6:
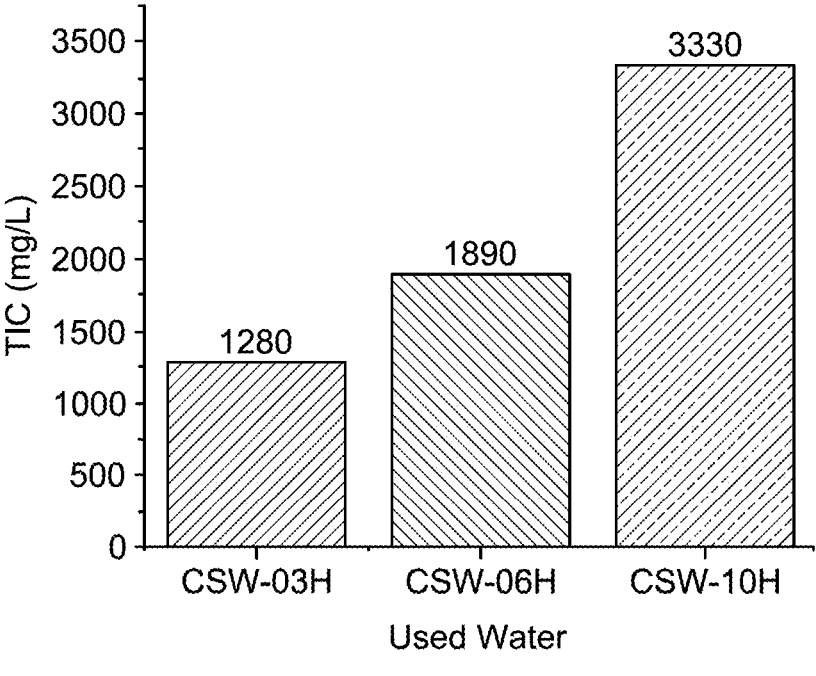

FIG. 6 is a bar graph comparing total inorganic carbon (TIC) content of a carbonated seawater with 0.3 wt. % HMDA flowed with a $CO_2$-containing gas (CSW-03H), a carbonated seawater with 0.6 wt. % HMDA flowed with a $CO_2$-containing gas (CSW-06H) and a carbonated seawater with 1.0 wt. % HMDA flowed with a $CO_2$-containing gas (CSW-10H), according to certain embodiments.

Figure 7:
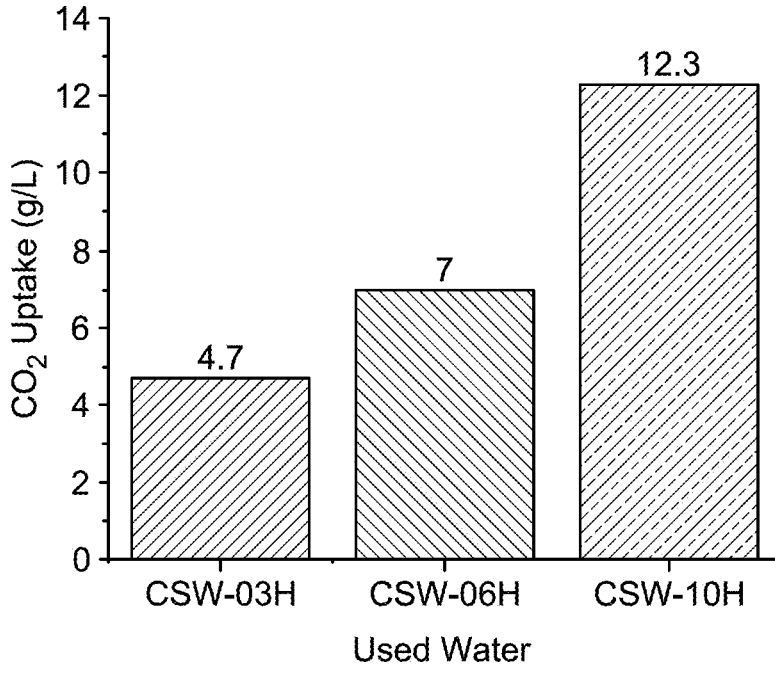

FIG. 7 is a bar graph comparing $CO_2$ uptake capacity of the carbonated seawater samples, CSW-03H, CSW-06H and CSW-10H, according to certain embodiments.

Figure 8A:
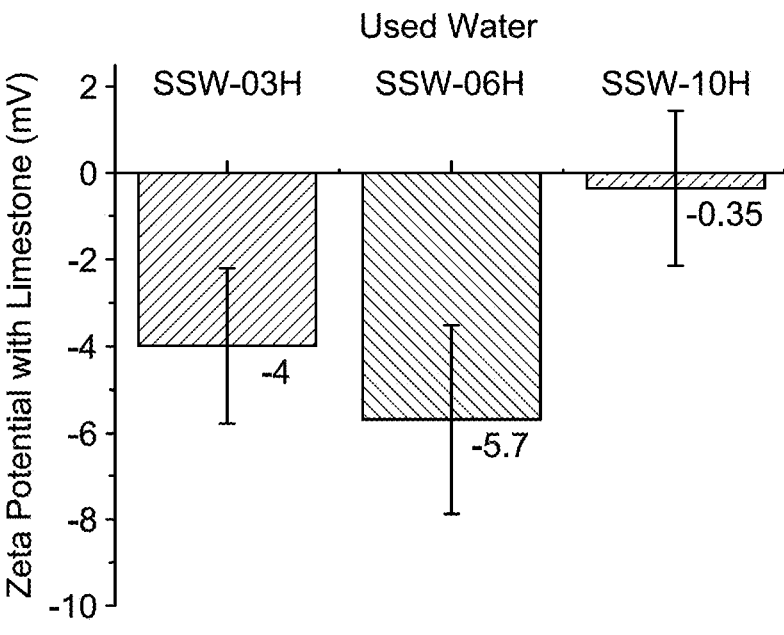

FIG. 8A is a bar graph showing zeta potential measured at an interface between a limestone and SSW-03H, SSW-06H and SSW-10H, according to certain embodiments.

Figure 8B:
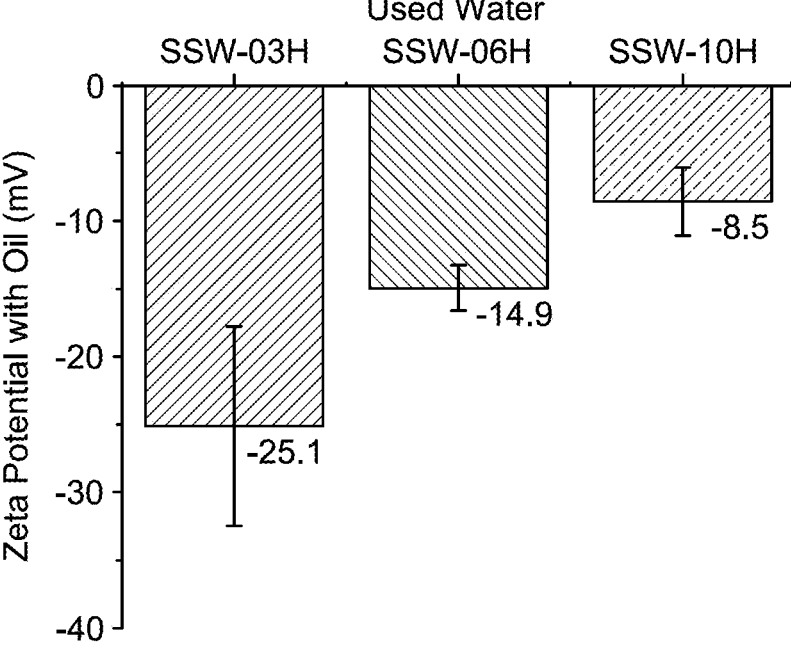

FIG. 8B is a bar graph comparing zeta potential measured in an emulsion of oil with SSW-03H, the SSW-06H and SSW-10H, according to certain embodiments.

Figure 9A:
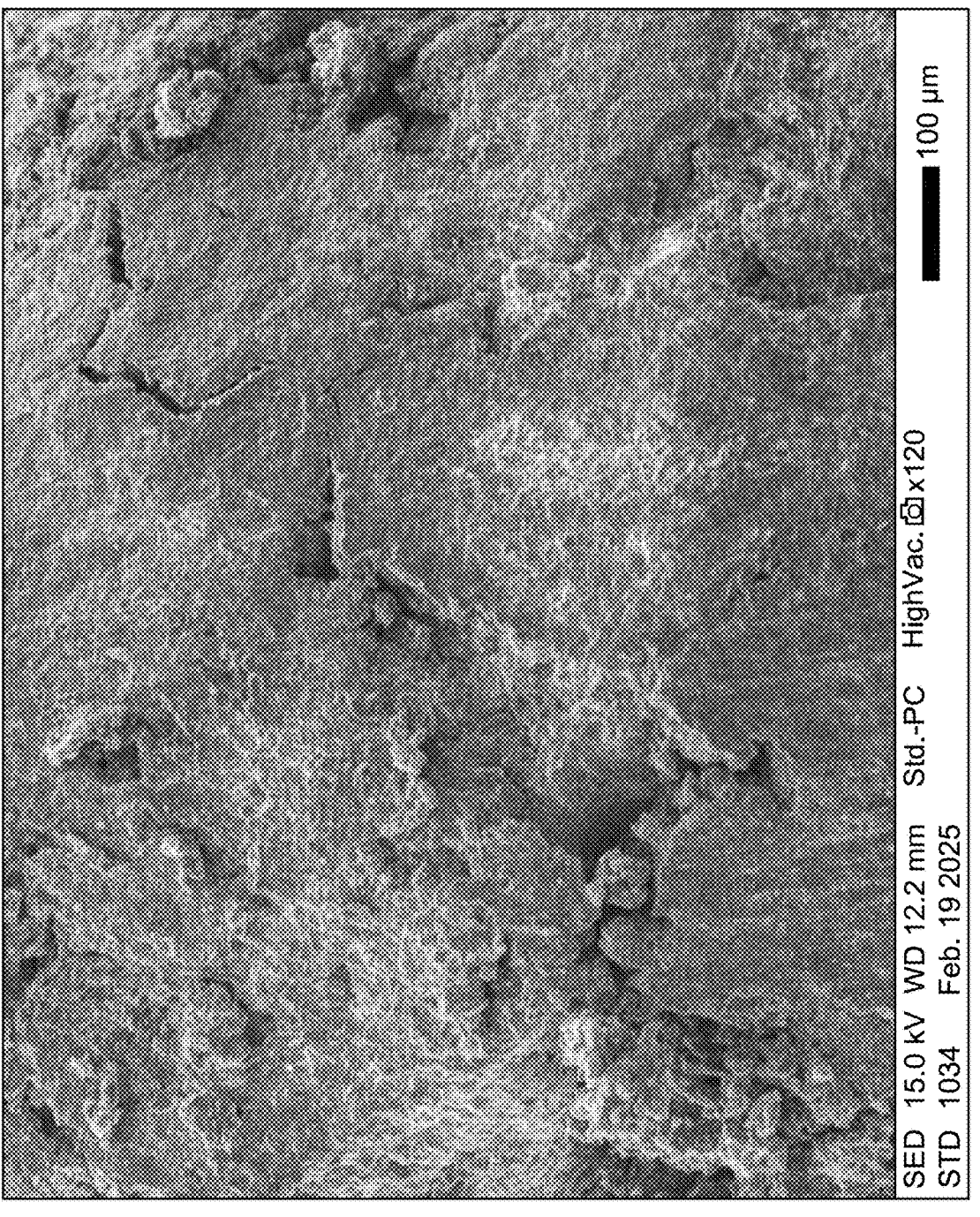

FIG. 9A is a scanning electron microscopy (SEM) image of carbonate minerals precipitated from SSW-03H with a scale bar of 100 micrometers (μm), according to certain embodiments.

Figure 9B:
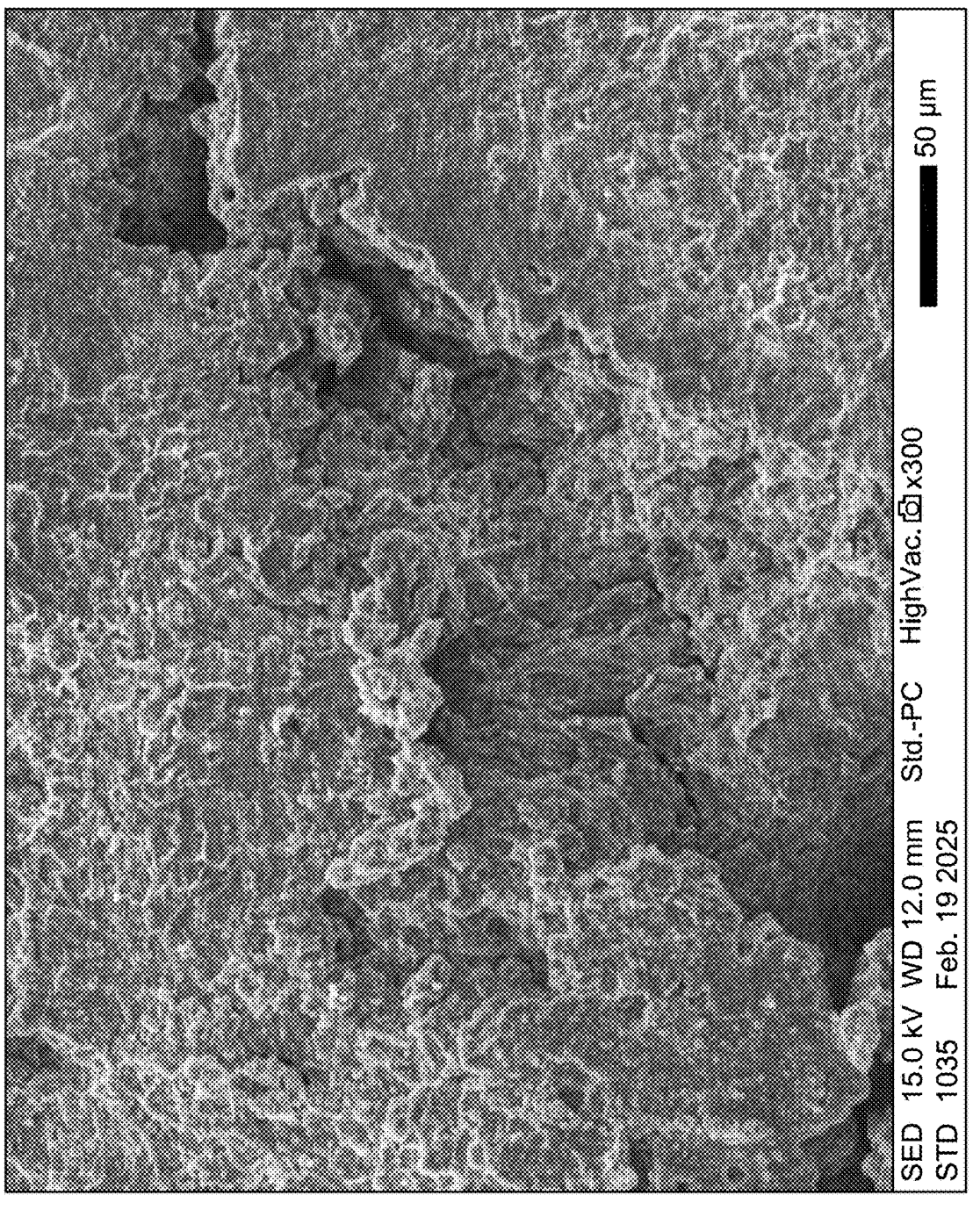

FIG. 9B is a SEM image of the carbonate minerals precipitated from SSW-03H with a scale bar of 50 μm, according to certain embodiments.

Figure 9C:
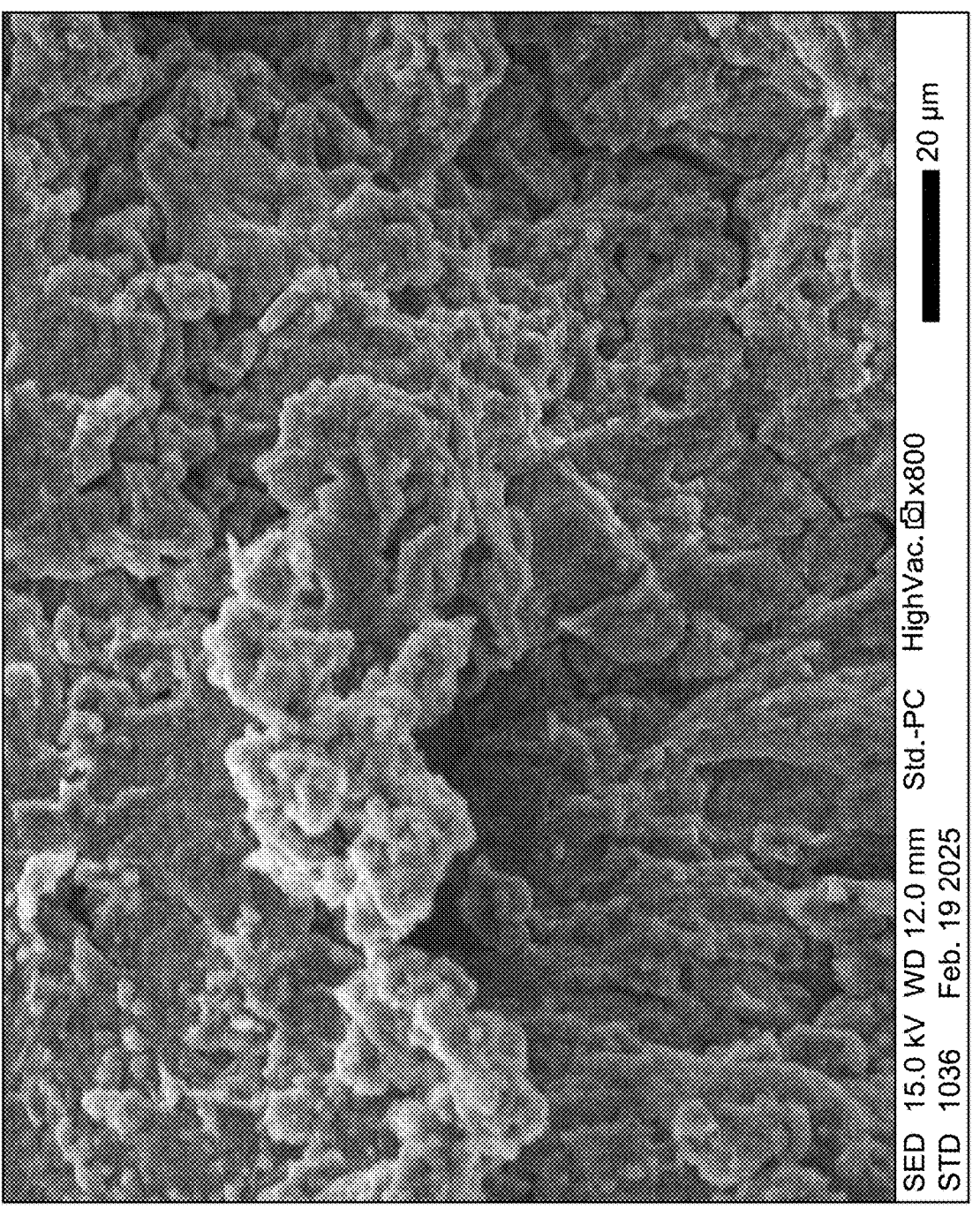

FIG. 9C is a SEM image of the carbonate minerals precipitated from SSW-03H with a scale bar of 20 μm, according to certain embodiments.

Figure 9D:
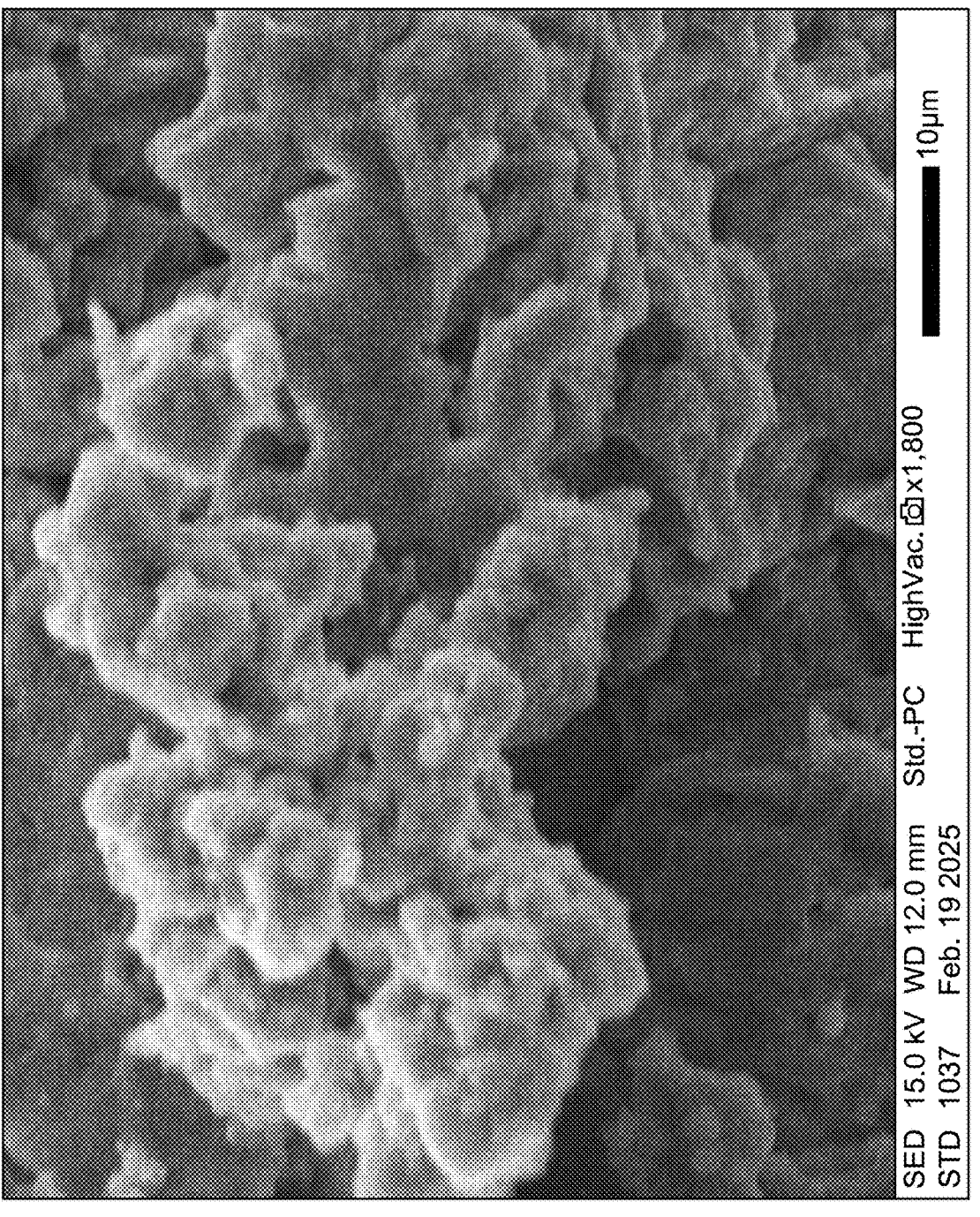

FIG. 9D is a SEM image of the carbonate minerals precipitated from SSW-03H with a scale bar of 10 μm, according to certain embodiments.

Figure 10A:
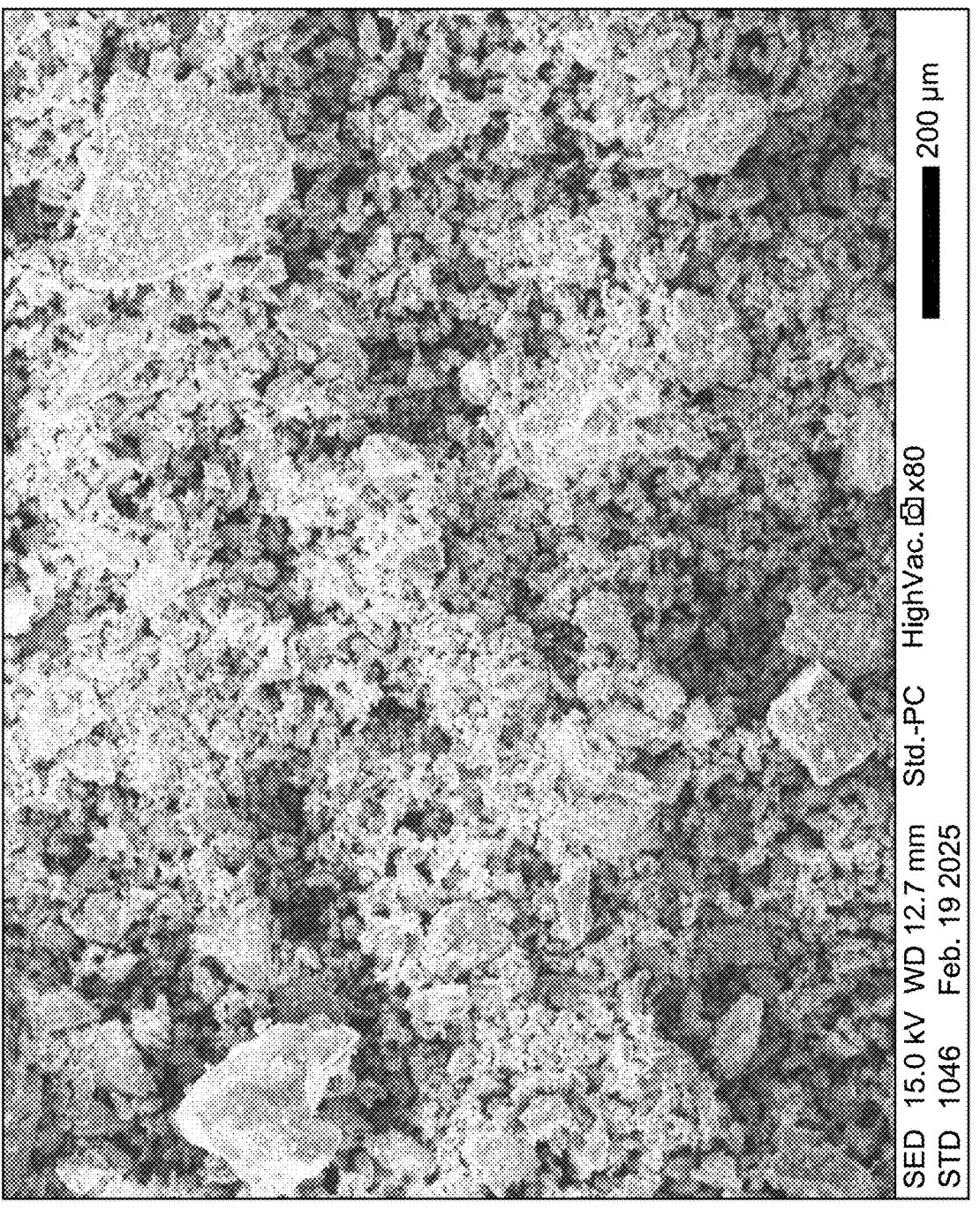

FIG. 10A is a SEM image of carbonate minerals precipitated from SSW-06H with a scale bar of 200 μm, according to certain embodiments.

Figure 10B:
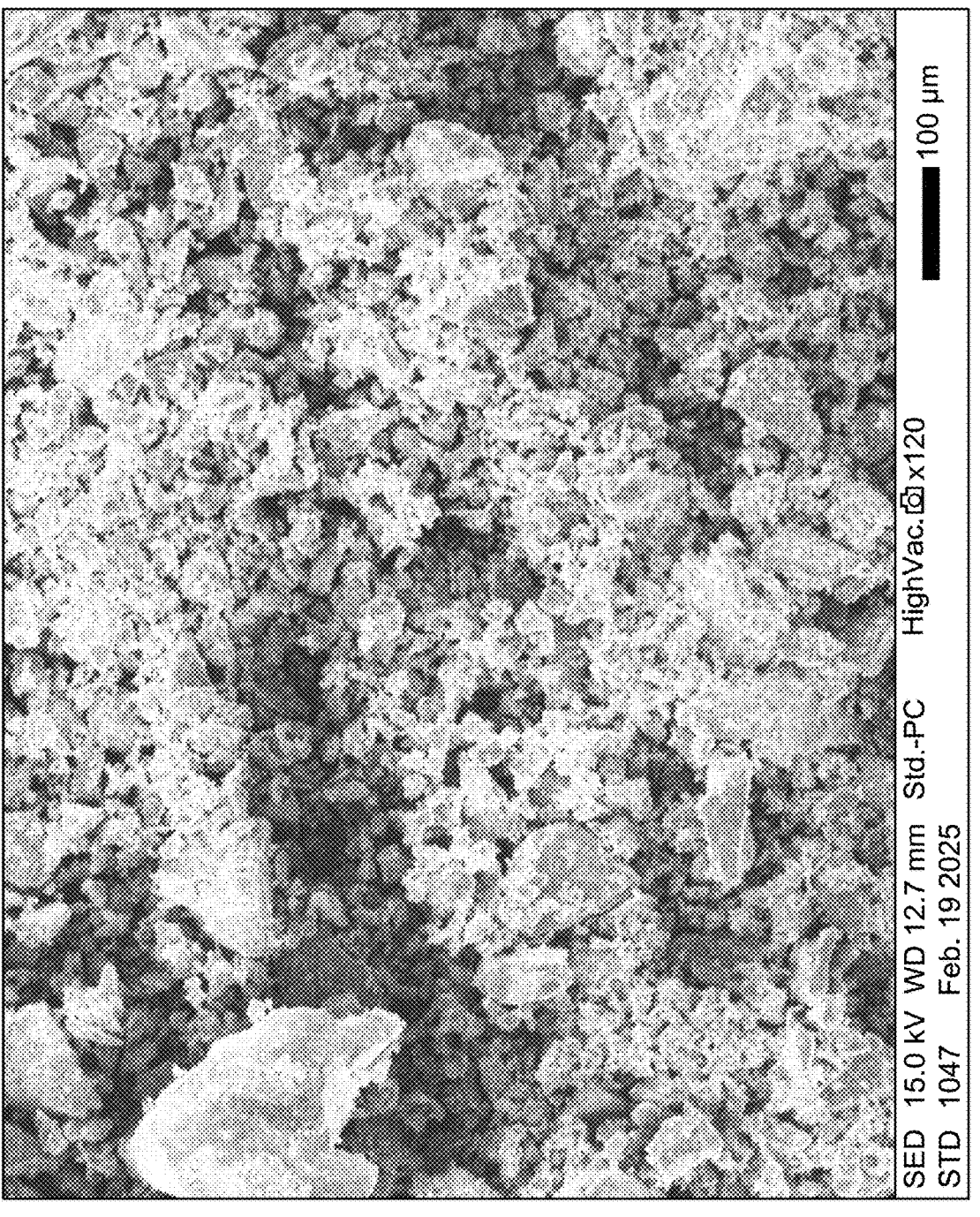

FIG. 10B is a SEM image of the carbonate minerals precipitated from SSW-06H with a scale bar of 100 μm, according to certain embodiments.

Figure 10C:
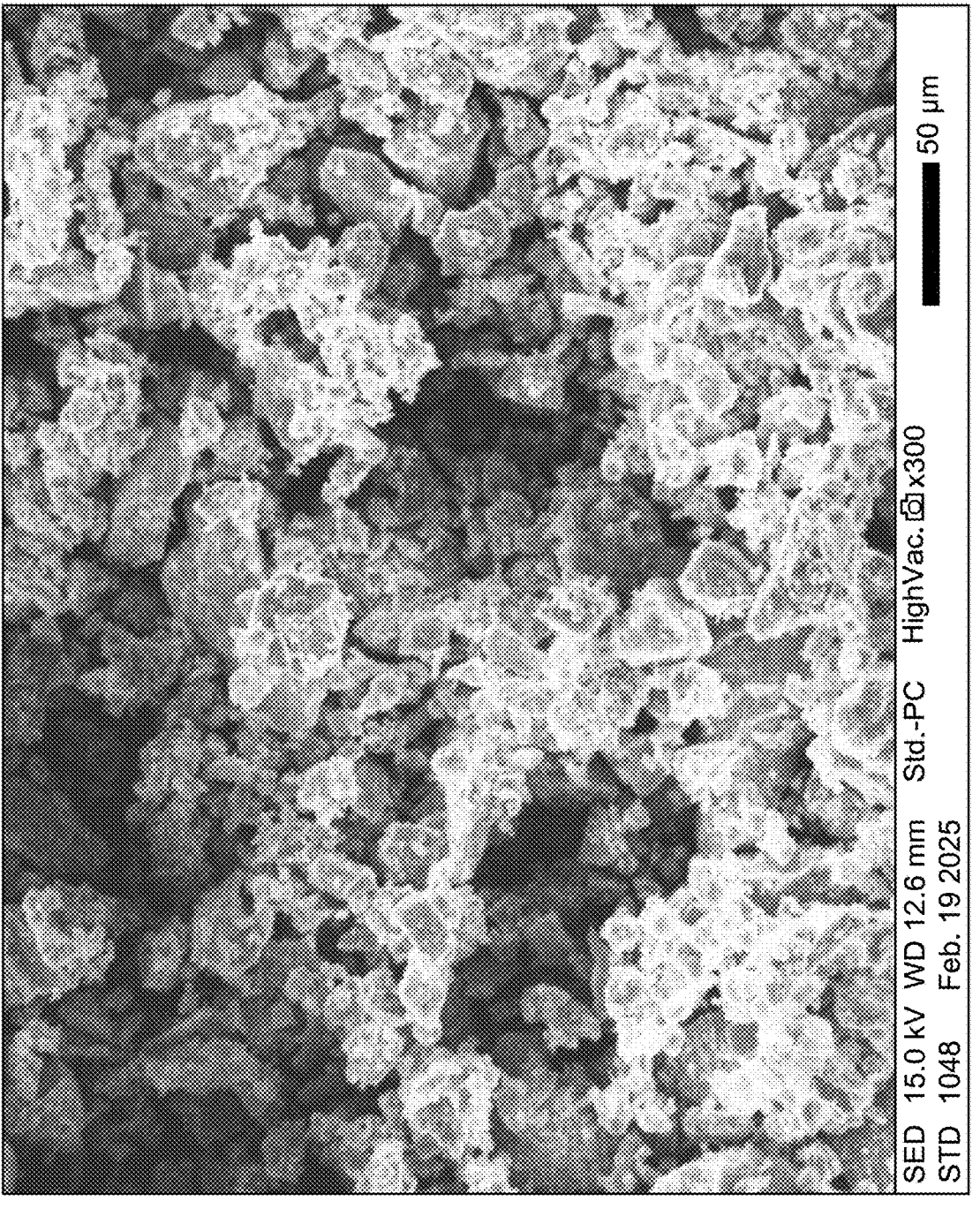

FIG. 10C is a SEM image of the carbonate minerals precipitated from SSW-06H with a scale bar of 50 μm, according to certain embodiments.

Figure 10D:
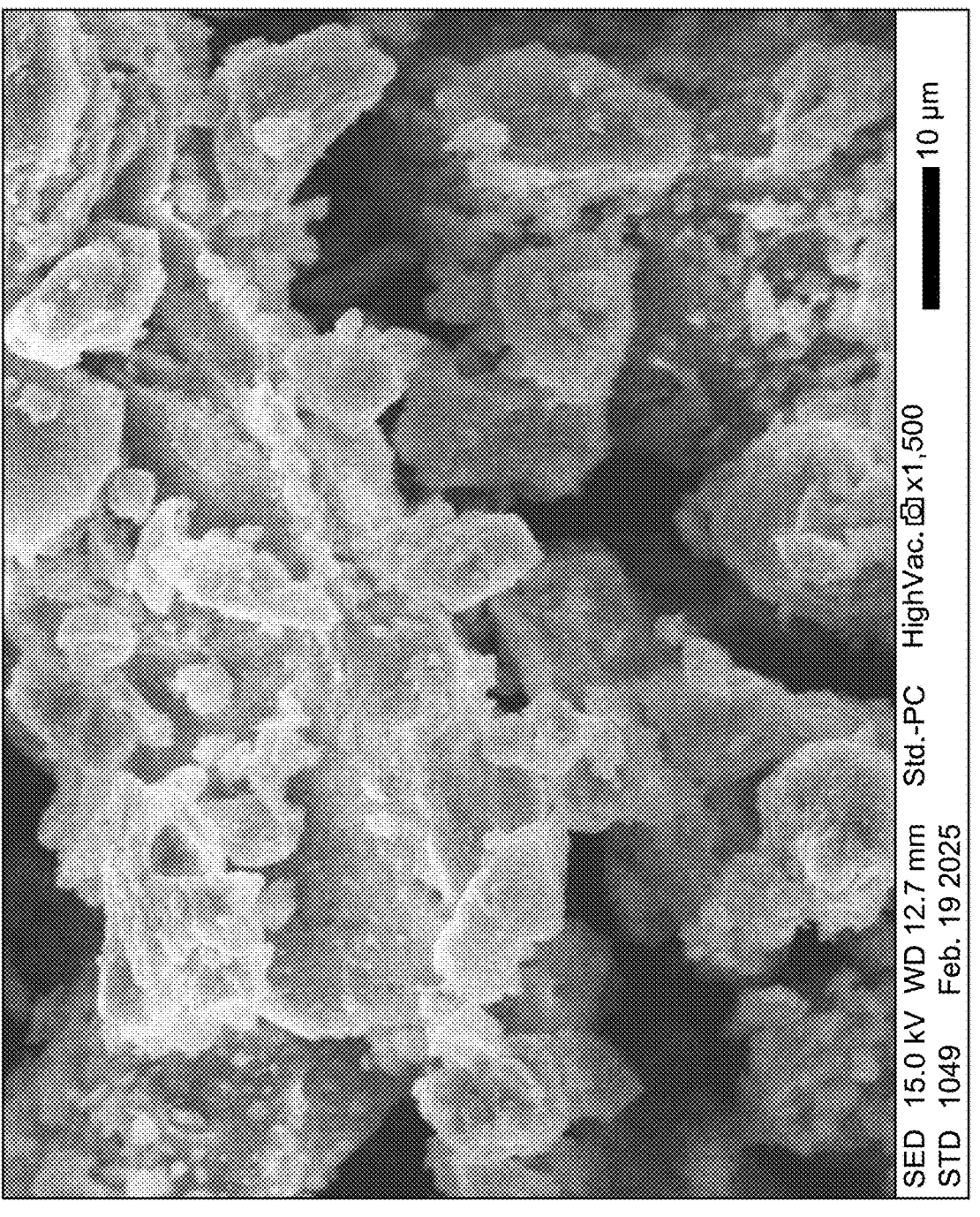

FIG. 10D is a SEM image of the carbonate minerals precipitated from SSW-06H with a scale bar of 10 μm, according to certain embodiments.

Figure 11A:
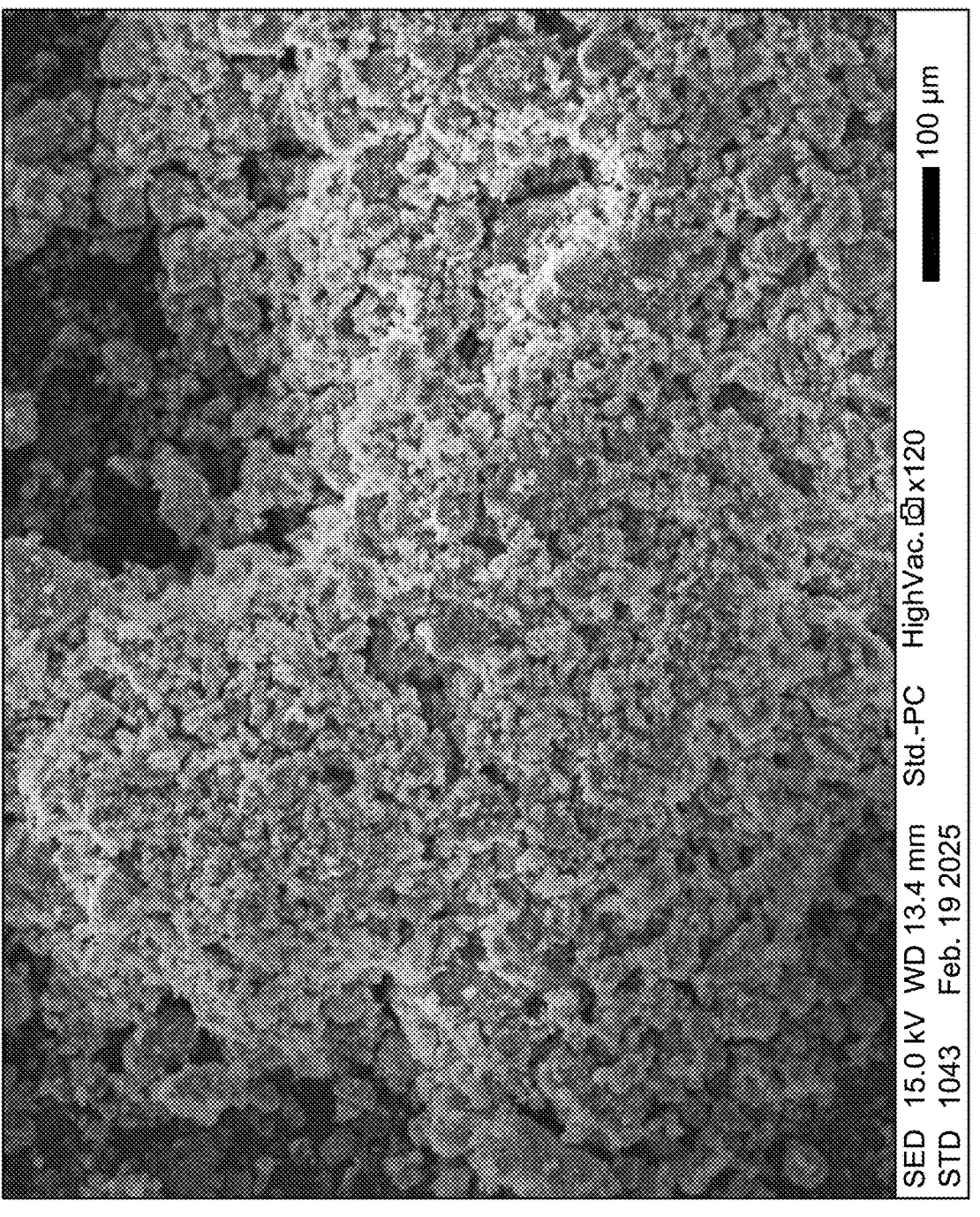

FIG. 11A is a SEM image of carbonate minerals precipitated from SSW-10H with a scale bar of 100 μm, according to certain embodiments.

Figure 11B:
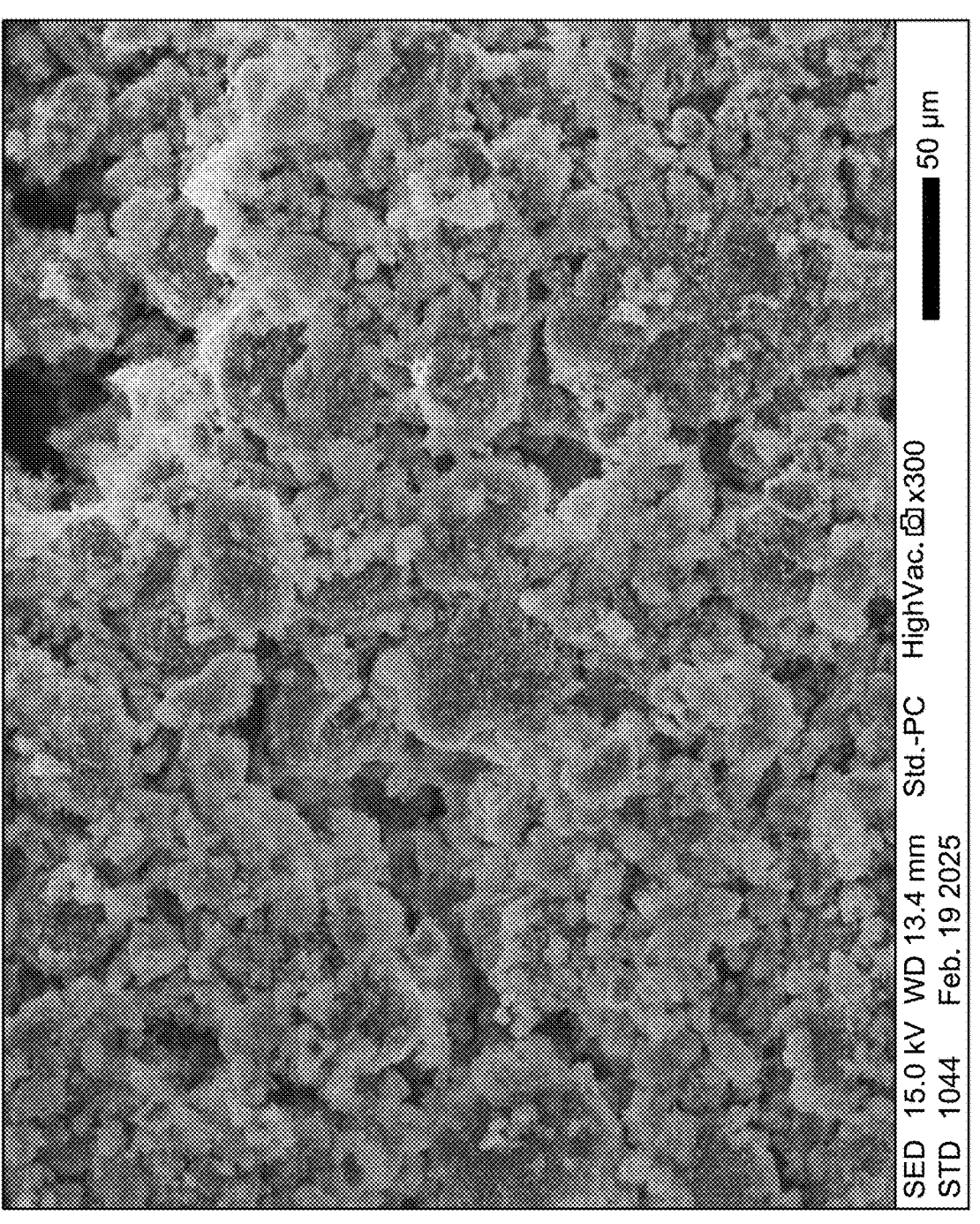

FIG. 11B is a SEM image of the carbonate minerals precipitated from SSW-10H with a scale bar of 50 μm, according to certain embodiments.

Figure 11C:
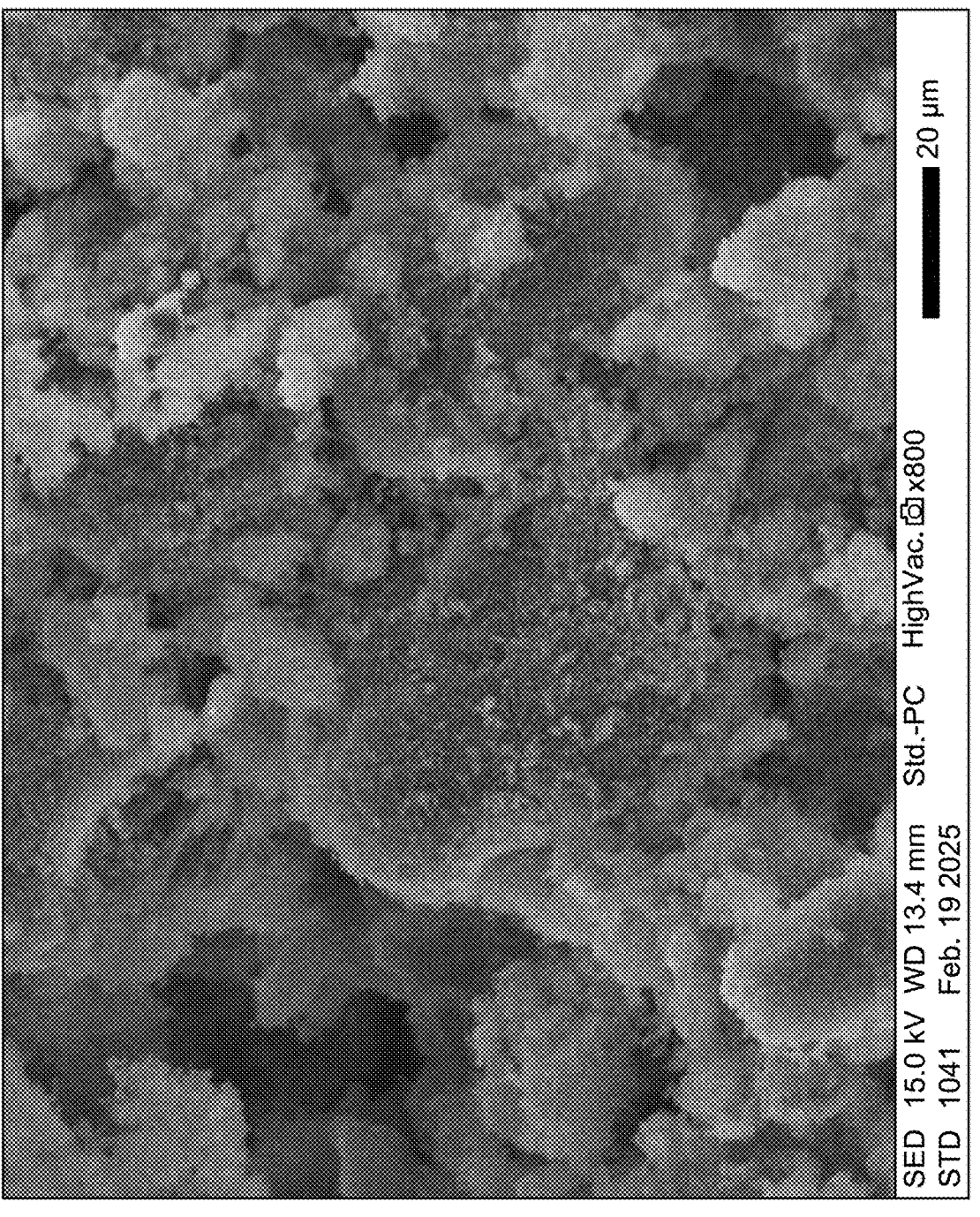

FIG. 11C is a SEM image of carbonate minerals precipitated from SSW-10H with a scale bar of 20 μm, according to certain embodiments.

Figure 11D:
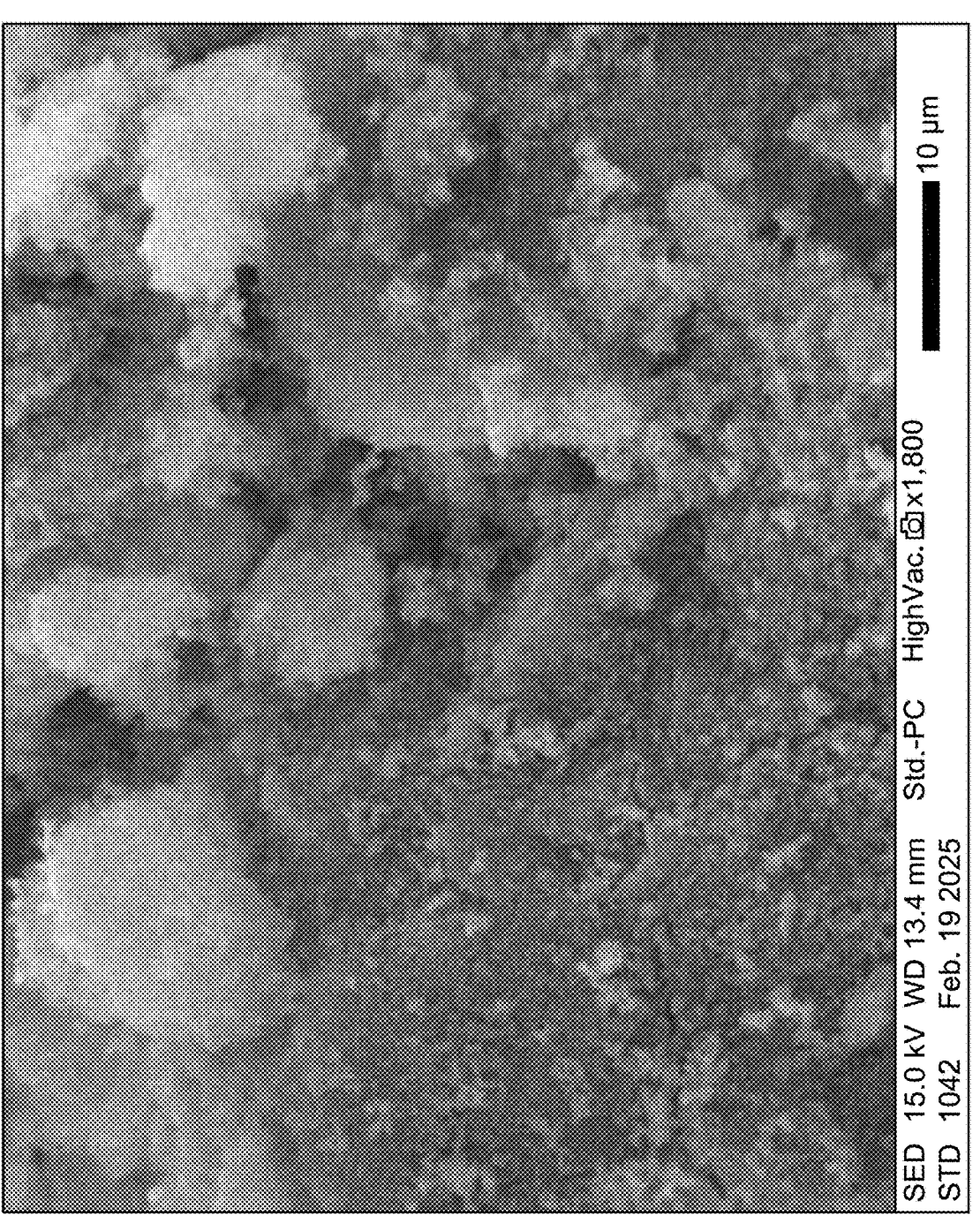

FIG. 11D is a SEM image of the carbonate minerals precipitated from SSW-10H with a scale bar of 10 μm, according to certain embodiments.

Figure 12A:
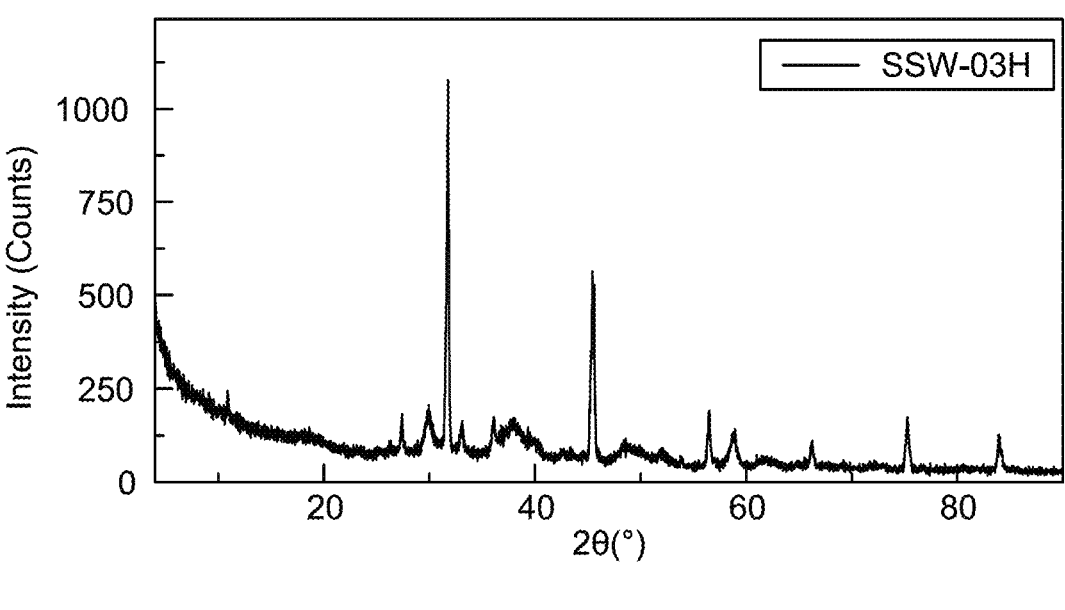

FIG. 12A is an X-Ray diffraction (XRD) spectrum of the carbonate minerals precipitated from SSW-03H, according to certain embodiments.

Figure 12B:
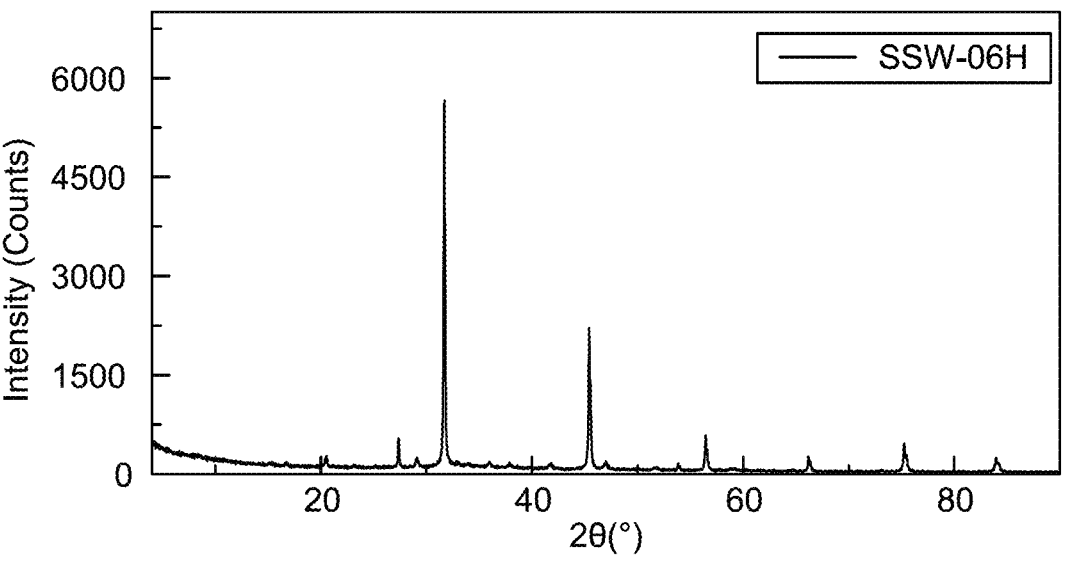

FIG. 12B is an XRD spectrum of the carbonate minerals precipitated from SSW-06H, according to certain embodiments.

Figure 12C:
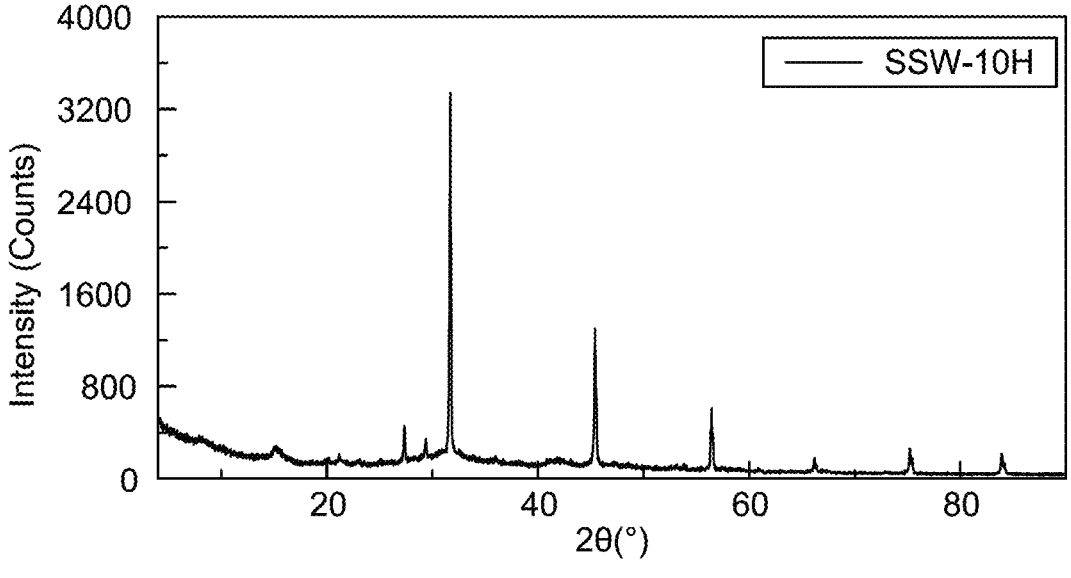

FIG. 12C is an XRD spectrum of the carbonate minerals precipitated from SSW-10H, according to certain embodiments.

Figure 13A:
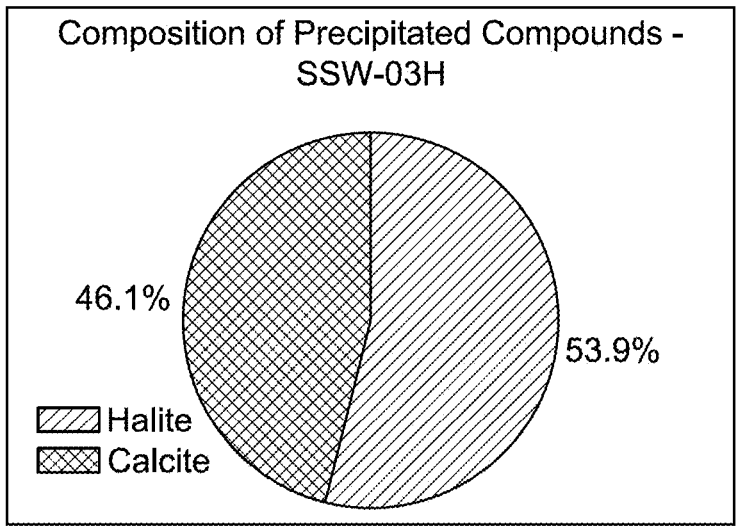

FIG. 13A shows a composition of the carbonate minerals precipitated from SSW-03H, according to certain embodiments.

Figure 13B:
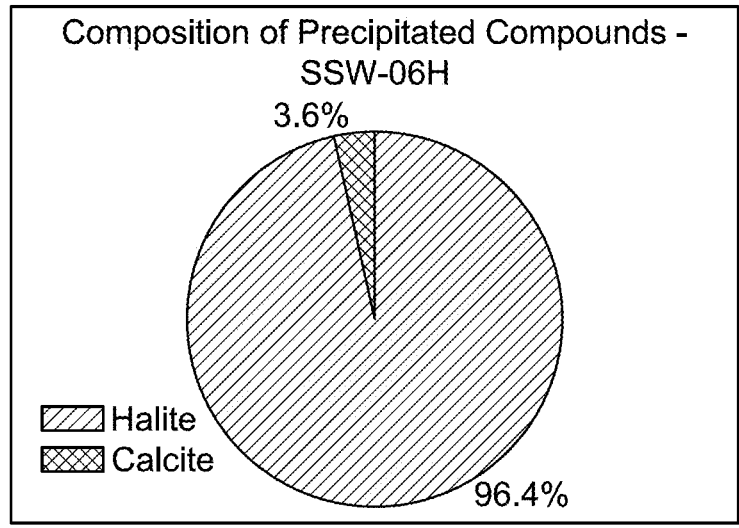

FIG. 13B shows a composition of the carbonate minerals precipitated from SSW-06H, according to certain embodiments.

Figure 13C:
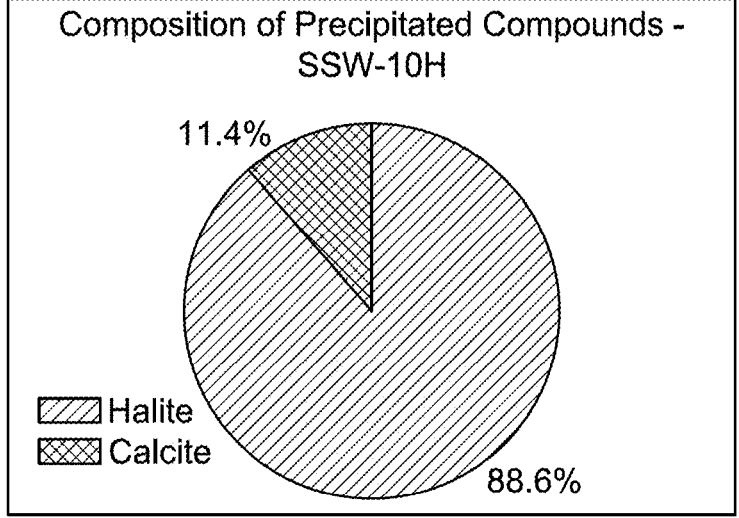

FIG. 13C shows a composition of the carbonate minerals precipitated from SSW-10H, according to certain embodiments.

Figure 14A:
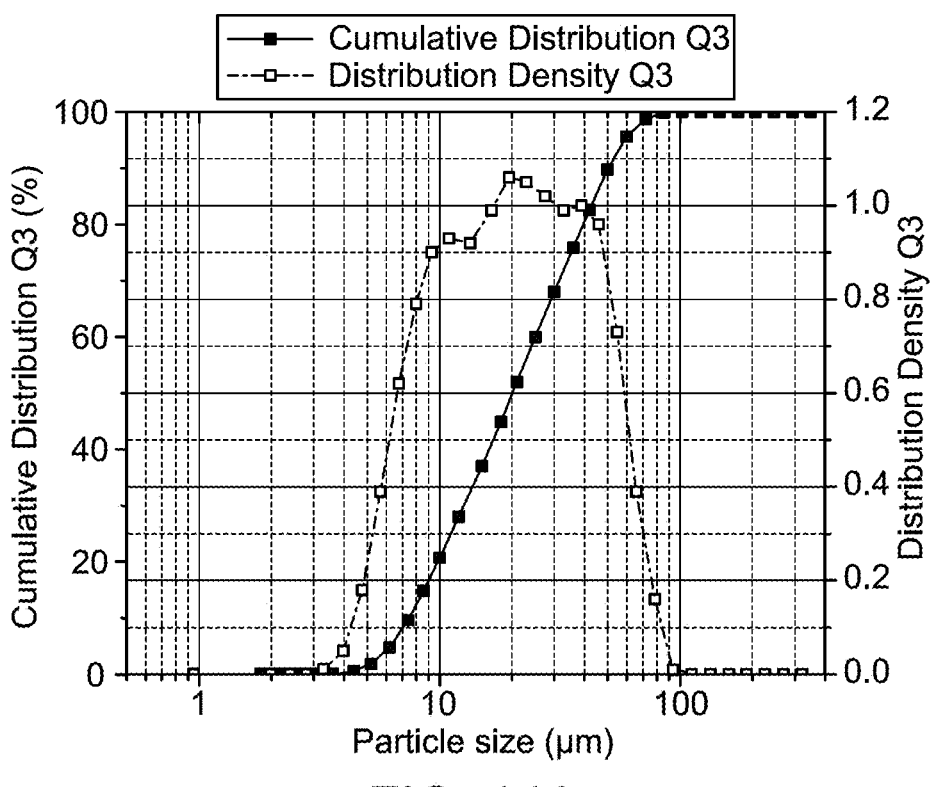

FIG. 14A shows a particle size distribution (PSD) of the carbonate minerals precipitated from SSW-03H, according to certain embodiments.

Figure 14B:
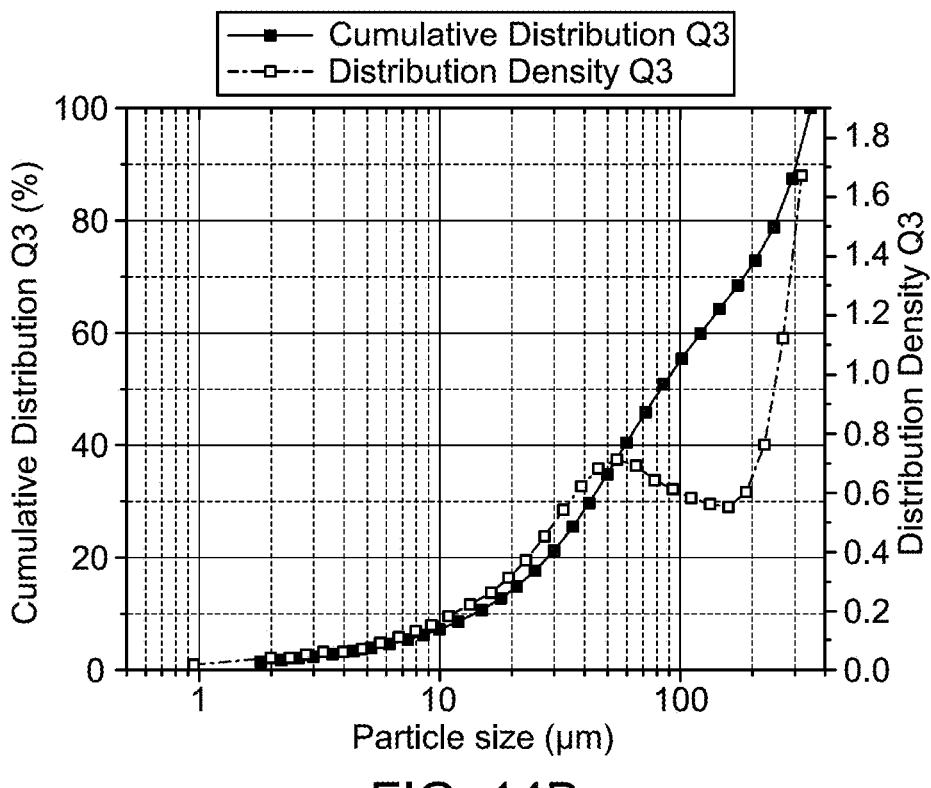

FIG. 14B shows a PSD of the carbonate minerals precipitated from SSW-06H, according to certain embodiments.

Figure 14C:
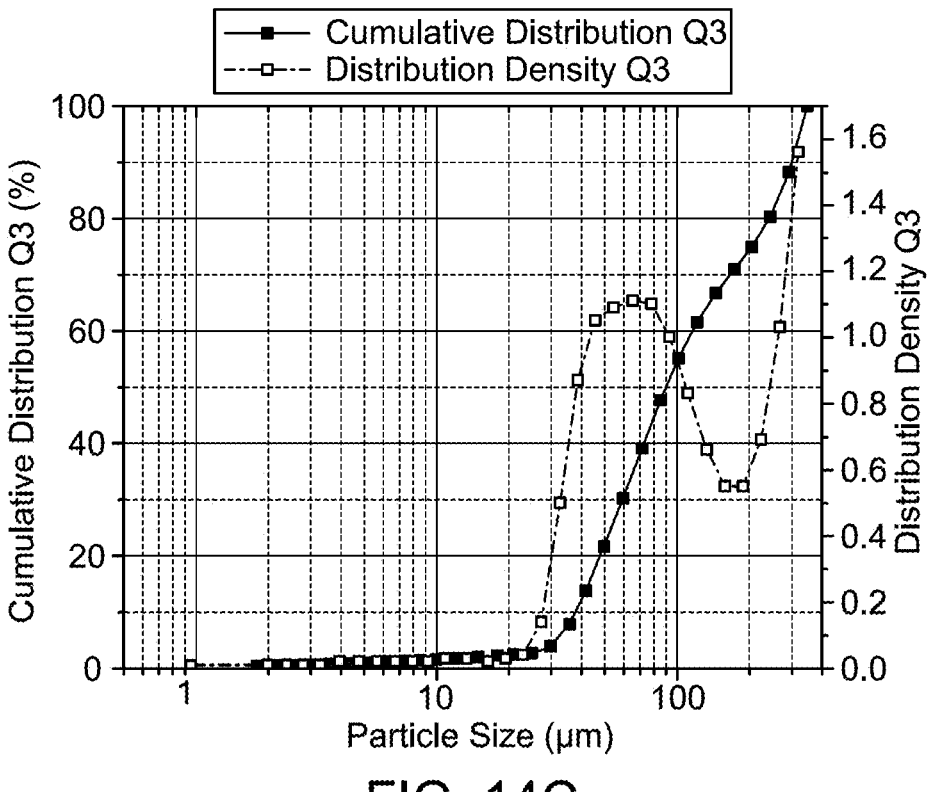

FIG. 14C shows a PSD of the carbonate minerals precipitated from SSW-10H, according to certain embodiments.

Figure 15:
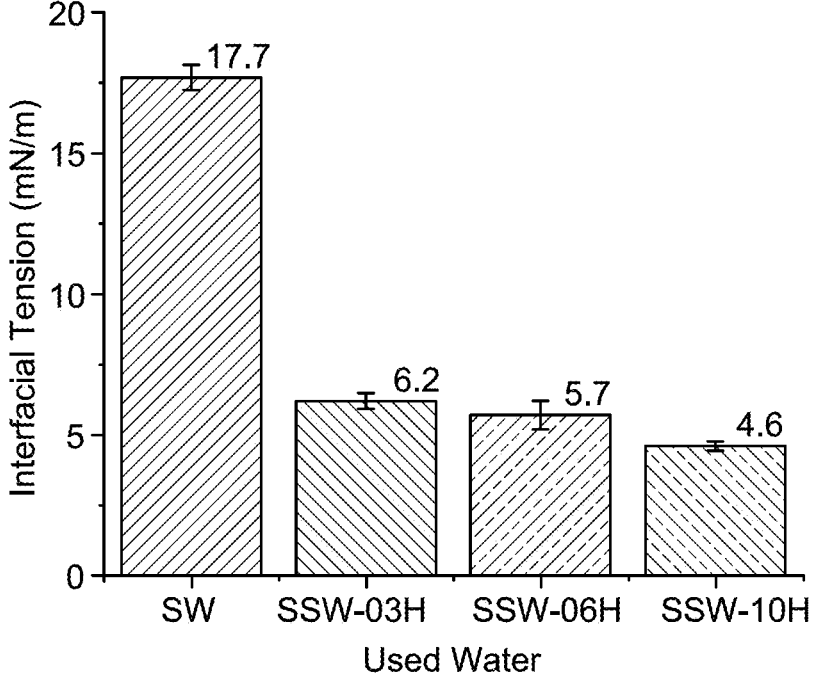

FIG. 15 is a bar graph comparing interfacial tension (IFT) of seawater, SSW-03H, SSW-06H and SSW-10H, according to certain embodiments.

Figure 16:
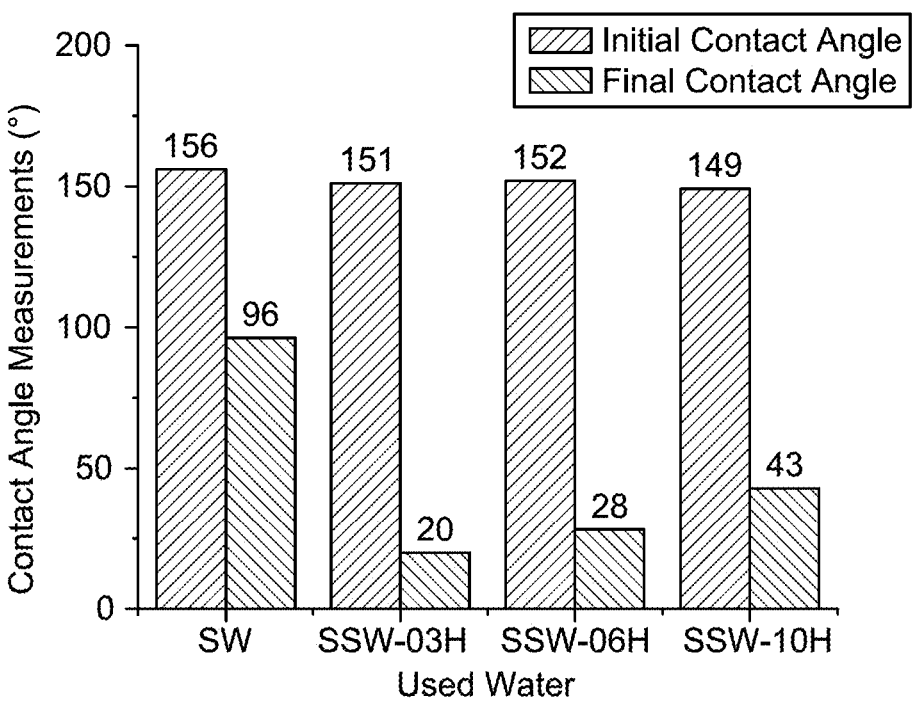

FIG. 16 is a bar graph showing an initial and final contact angle of seawater, SSW-03H, SSW-06H and SSW-10H, according to certain embodiments.

Figure 17:
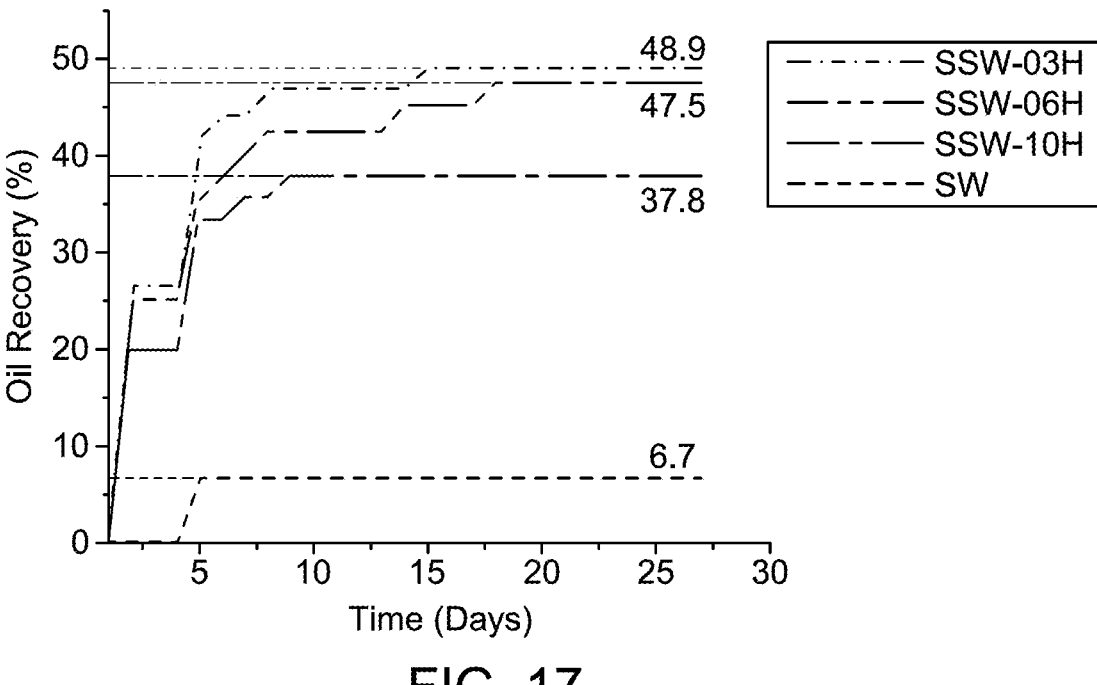

FIG. 17 is a comparison of spontaneous inhibition recovery efficiency in terms of oil recovery rate when using seawater, SSW-03H, SSW-06H and SSW-10H in an Amott cell, according to certain embodiments.

DETAILED DESCRIPTION

Embodiments of the present invention will now be described more fully hereinafter with reference to the accompanying drawings wherever applicable, in that some, but not all, embodiments of the disclosure are shown.

When describing the present disclosure, the terms used are to be construed in accordance with the following definitions, unless a context dictates otherwise.

In the drawings, like reference numerals designate identical or corresponding parts throughout the several views. Further, as used herein, the words 'a', 'an' and the like generally carry a meaning of 'one or more,' unless stated otherwise.

Furthermore, the terms 'approximately', 'approximate', 'about' and similar terms generally refer to ranges that include the identified value within a margin of 20%, 10%, or preferably 5%, and any values therebetween.

As used herein, the term 'room temperature' refers to a temperature range of '25 degrees Celsius (° C.)±3° C.

As used herein, the term 'concurrent oil extraction' refers to a process in which hydrocarbon recovery occurs simultaneously with another operation, such as $CO_2$ injection, mineralization, or water flooding, enabling both enhanced oil recovery and concurrent environmental or chemical transformation reactions.

As used herein, the term 'carbon dioxide ($CO_2$) mineralization' refers to the chemical conversion of gaseous $CO_2$ into stable carbonate or bicarbonate minerals through reactions with metal oxides, hydroxides, or silicate-bearing materials, thereby achieving long-term carbon sequestration.

As used herein, the term 'basalt rocks' refers to fine-grained igneous rocks rich in iron, magnesium, and calcium silicates, which are reactive toward $CO_2$ and suitable for mineral carbonation and subsurface storage applications.

As used herein, the term 'underground geological formation' refers to a naturally occurring subsurface structure composed of rocks, minerals, and pore spaces that can serve as a reservoir for fluid storage or flow, including oil-bearing strata, saline aquifers, or basaltic formations.

As used herein, the term 'total inorganic carbon' refers to the sum concentration of all inorganic carbon species present in a sample, including dissolved carbon dioxide ($CO_2$), bicarbonate ($HCO_3^-$), and carbonate ($CO_3^{2-}$) ions.

As used herein, the term 'zeta potential over a limestone rock' refers to the electrokinetic potential developed at the solid-liquid interface between limestone surfaces and the surrounding aqueous phase, indicating surface charge behaviour and influencing wettability and ion adsorption.

As used herein, the term 'zeta potential over oil' refers to the electrostatic potential at the boundary layer between crude oil droplets and the aqueous phase, determining interfacial stability and emulsion behaviour under varying chemical conditions.

As used herein, the term '$CO_2$ uptake' refers to the amount of carbon dioxide absorbed, adsorbed, or chemically fixed by a system—such as rocks, minerals, or solutions—under specified conditions of pressure and temperature.

As used herein, the term 'interfacial tension' refers to the force per unit length existing at the interface between two immiscible phases, such as oil and water, which governs droplet deformation, mobility, and capillary behaviour in porous media.

As used herein, the term 'crude oil' refers to a naturally occurring complex mixture of hydrocarbons and associated compounds extracted from underground reservoirs prior to any refining or processing.

As used herein, the term 'contact angle' refers to the angle formed at the junction of a liquid droplet and a solid surface in the presence of another immiscible phase, serving as an indicator of surface wettability characteristics.

A weight percent of a component, unless specifically stated to the contrary, is based on the total weight of the formulation or composition in which the component is included. For example, if a particular element or component in a composition or article is said to have 5 wt. %, it is understood that this percentage is in relation to a total compositional percentage of 100%.

The present disclosure is intended to include all hydration states of a given compound or formula, unless otherwise noted or when heating a material.

In addition, the present disclosure is intended to include all isotopes of atoms occurring in the present compounds and complexes. Isotopes include those atoms having the same atomic number but different mass numbers.

Aspects of the present disclosure are directed to a method of concurrent oil extraction and carbon dioxide ($CO_2$) mineralization in underground geological formations including basalt rocks. The method utilizes an aqueous solution containing seawater and hexamethylenediamine (HMDA) to enhance $CO_2$ absorption and facilitate in situ carbonate mineral precipitation, thereby achieving dual objectives of hydrocarbon recovery and permanent carbon sequestration.

FIG. 1 illustrates a schematic flow chart of a method 50 of concurrent oil extraction and carbon dioxide ($CO_2$) mineralization. The order in which the method 50 is described is not intended to be construed as a limitation, and any number of the described method steps can be combined to implement the method 50. Additionally, individual steps may be removed or skipped from the method 50 without departing from the spirit and scope of the present disclosure.

At step 52, the method 50 includes injecting into injecting a solution including seawater and hexamethylenediamine (HMDA) into a wellbore bored in an underground geological formation including basalt rocks. In some embodiments, HMDA is present in the seawater solution at a concentration ranging from 0.1 to 1.0 wt. %, preferably 0.1 to 0.5 wt. %, preferably 0.1 to 0.4 wt. %, preferably 0.5 to 1.0 wt. %, based on a total weight of the solution. In a preferred embodiment, the HMDA concentration is about 0.3 wt. % based on the total weight of the solution. In yet another preferred embodiment, the HMDA concentration is about 0.6 wt. % based on the total weight of the solution. In yet another preferred embodiment, the HMDA concentration is about 1.0 wt. % based on the total weight of the solution. These concentration levels may be selected depending on the $CO_2$ absorption capacity required, the mineralization kinetics within the basaltic formation, and the compatibility of the injected solution with formation fluids.

In some embodiments, the seawater, which may be natural or synthetic, includes total dissolved solids (TDS) in the range of 50,000 ppm to 80,000 ppm, preferably 55,000 ppm to 65,000 ppm, and more preferably 57,000 ppm to 58,000 ppm. In some embodiments, the seawater includes a plurality of ions selected from sodium ions ($Na^+$), calcium ions ($Ca^{2+}$), magnesium ions ($Mg^{2+}$), sulfate ions ($SO_4^{2-}$), chloride ions ($Cl^-$), and bicarbonate ions ($HCO_3^-$). In some embodiments, the seawater includes sodium ions ($Na^+$) in a concentration range of 15,000 ppm to 25,000 ppm, preferably 17,000 ppm to 20,000 ppm, and more preferably about 18,300 ppm. In some embodiments, the seawater includes calcium ions ($Ca^{2+}$) in a concentration range of 500 ppm to 1,500 ppm, preferably 600 ppm to 800 ppm, and more preferably about 650 ppm. In some embodiments, the seawater includes magnesium ions ($Mg^{2+}$) in a concentration range of 2,000 ppm to 4,000 ppm, preferably 2,000 ppm to 2,500 ppm, and more preferably about 2,110 ppm. In some embodiments, the seawater includes sulfate ions ($SO_4^{2-}$) in a concentration range of 2,000 ppm to 5,000 ppm, preferably 4,000 ppm to 4,500 ppm, and more preferably about 4,290 ppm. In some embodiments, the seawater includes chloride ions ($Cl^-$) in a concentration range of 30,000 ppm to 50,000 ppm, preferably 31,000 ppm to 35,000 ppm, and more preferably about 32,200 ppm. In some embodiments, the seawater includes bicarbonate ions ($HCO_3^-$) in a concentration range of 100 ppm to 500 ppm, preferably 100 ppm to 200 ppm, and more preferably about 120 ppm. In a preferred embodiment, the seawater includes total dissolved solids of about 57,670 ppm, containing about 18,300 ppm $Na^+$, about 650 ppm $Ca^{2+}$, about 2, 110 ppm $Mg^{2+}$, about 4,290 ppm $SO_4^{2-}$, about 32,200 ppm $Cl^-$, and about 120 ppm $HCO_3^-$.

At step 54, the method 50 includes flowing a $CO_2$-containing gas into the solution to form a carbonated solution submerged in the underground geological formation, where the $CO_2$-containing gas includes mainly $CO_2$. In one embodiment, when HMDA is present in the solution at a concentration of about 0.1 to 0.5 wt. %, preferably about 0.3 wt. %, based on the total weight of the solution, the resulting carbonated solution exhibits a total inorganic carbon (TIC) content in the range of about 1000 to 1500 mg/L, preferably 1200 to 1500 mg/L, and more preferably 1280 mg/L and a $CO_2$ uptake of about 4.0 to 5.0 g/L, preferably 4.5 to 5.0 g/L, and more preferably 4.7 g/L. Under such conditions, carbonate minerals are precipitated in an amount of about 10.0 to 15.0 grams per liter of the carbonated solution, preferably 12 to 15 grams per liter of the carbonated solution, and more preferably 13 grams per liter of the carbonated solution, including halite in an amount of about 50 to 60 wt. %, preferably 53 to 60 wt. %, and more preferably 53.9 wt. %, calcite in an amount of about 45 to 65 wt. %, preferably 50 to 60 wt. %, and more preferably 46.1 wt. %, based on the total weight of the carbonate minerals. In a preferred embodiment, HMDA is present in the solution at a concentration of about 0.3 wt. % based on the total weight of the solution, and the resulting carbonated solution exhibits a total inorganic carbon (TIC) content of 1,280 mg/L and a $CO_2$ uptake of 4.7 g/L, and the carbonate minerals precipitated contains 53.9 wt. % halite and 46.1 wt. % calcite.

In some embodiments, the carbonate minerals have a morphology including spherical, rod-like, needle-like, plate-like, flaky, scalenohedral, rhombohedral, prismatic, fibrous, acicular, globular, botryoidal, dendritic, tabular, columnar, lamellar, granular, ellipsoidal, aggregated flower-like, and star-shaped structures. In a preferred embodiment, the carbonate minerals include porous globular aggregates having an irregular shape and a particle size of 2 to 10 μm, preferably 2 to 9 μm, more preferably 2 to 8 μm.

In another embodiment, when HDMA is present at a concentration of about 0.5 to 0.7 wt. %, preferably about 0.6 wt. %, based on the total weight of the solution, the carbonated solution exhibits an increased TIC content in the range of about 1500 to 2000 mg/L, preferably 1600 to 2000 mg/L, and more preferably 1890 mg/L and a $CO_2$ uptake of about 7.0 to 8.0 g/L, preferably 7.1 to 7.3 g/L, and more preferably 7.0 g/L. The carbonate minerals precipitated under these conditions are present in an amount of about 15.0 to 20.0 grams per liter of the carbonated solution, preferably 16.29 grams per liter of the carbonated solution and include halite in an amount of about 85 to 99 wt. %, preferably 90 to 99 wt. %, and more preferably 96.4 wt. %, calcite in an amount of about 1 to 5 wt. %, preferably 3 to 5 wt. %, and more preferably 3.6 wt. %, based on the total weight of the carbonate minerals. In a preferred embodiment, HMDA is present in the solution at a concentration of about 0.6 wt. % based on the total weight of the solution, and the resulting carbonated solution exhibits a total inorganic carbon (TIC) content of 1,890 mg/L and a $CO_2$ uptake of 7 g/L, and the carbonate minerals precipitated contains 96.4 wt. % halite and 3.6 wt. % calcite.

In some embodiments, the carbonate minerals have a morphology including spherical, rod-like, needle-like, plate-like, flaky, scalenohedral, rhombohedral, prismatic, fibrous, acicular, globular, botryoidal, dendritic, tabular, columnar, lamellar, granular, ellipsoidal, aggregated flower-like, and star-shaped structures. In a preferred embodiment, the carbonate minerals include a faceted and angular morphology having a layered structure. The particles have a bimodal size distribution with a particle size of 10 to 20 μm.

In yet another embodiment, when HDMA is present in the solution at a concentration of about 0.7 to 1.0 wt. %, preferably 1.0 wt. % based on the total weight of the solution, the carbonated solution exhibits a TIC content of about 3000 to 4000 mg/L, preferably 3200 to 3500 mg/L, and more preferably 3330 mg/L, and a $CO_2$ uptake of about 10.0 to 15.5 g/L, preferably 12 to 15 g/L, and more preferably 12.3 g/L. The carbonate minerals are precipitated in a higher amount of about 7.0 to 10.0 grams per liter of the carbonated solution, preferably 8.4 grams per liter of the carbonated solution and includes halite in an amount of about 75 to 95 wt. %, preferably 80 to 95 wt. %, and more preferably 88.6 wt. %, calcite in an amount of about 10 to 15 wt. %, preferably 12 to 15 wt. %, and more preferably 11.4 wt. %, based on the total weight of the carbonate minerals. In a preferred embodiment, HMDA is present in the solution at a concentration of about 1.0 wt. % based on the total weight of the solution, and the resulting carbonated solution exhibits a total inorganic carbon (TIC) content of 3,330 mg/L and a $CO_2$ uptake of 12.3 g/L, and the carbonate minerals precipitated contains 88.6 wt. % halite and 11.4 wt. % calcite.

In some embodiments, the carbonate minerals have a morphology including spherical, rod-like, needle-like, plate-like, flaky, scalenohedral, rhombohedral, prismatic, fibrous, acicular, globular, botryoidal, dendritic, tabular, columnar, lamellar, granular, ellipsoidal, aggregated flower-like, and star-shaped structures. In a preferred embodiment, the carbonate minerals include a plurality of amorphous particles having a particle size of 15 to 50 μm.

In some embodiments, the variations in carbonate mineral composition with increasing HDMA concentration are indicative of changing carbonate nucleation and growth kinetics, where higher amine concentrations favor the formation of aragonite and dolomite over brucite and calcite. In alternative embodiments, other alkylamines such as methylamine, ethylamine, or propylamine may be substituted for HDMA to achieve comparable or tunable mineral precipitation behavior, depending on their basicity and steric characteristics.

In another embodiment, the $CO_2$-containing gas may further include minor proportions of other gases such as $N_2$, $O_2$, or $CH_4$, wherein the $CO_2$ concentration is at least 80 vol. %. In certain embodiments, the carbonation process is performed under a pressure ranging from about 5 to 15 bar and at a temperature between about 25° C. and 60° C.

In an alternative embodiment, the carbonation may be carried out using naturally dissolved $CO_2$ from geothermal or volcanic sources, or from flue gas streams originating from industrial exhaust, provided that the partial pressure of $CO_2$ is sufficient to achieve the targeted TIC levels.

In another embodiment, the formation of carbonate minerals may vary depending on the local geochemistry of the basalt formation. For example, brucite may dominate in magnesium-rich formations, while calcite and dolomite formation may increase in calcium-bearing basaltic environments. In certain cases, additional secondary phases such as magnesite or hydro magnesite may be observed in minor quantities (<1 wt. %). In yet another embodiment, the total precipitation of carbonate minerals may range between about 6.0 and 9.0 g/L, depending on the concentration of HDMA or other alkyl amines present in the injected solution, the residence time of the carbonated fluid, and the $CO_2$ injection rate.

At step 56, the method 50 includes injecting a basic solution into the carbonated solution to induce precipitation of a plurality of carbonate minerals and to form a treated water. The basic solution includes sodium hydroxide at a concentration of about 1 to 2 wt. %, preferably about 1.2 to 1.8 wt. %, and more preferably about 1.2 wt. %, based on the total weight of the basic solution. In a preferred embodiment, the basic solution includes sodium hydroxide at a concentration of 1.2 wt. %.

In other embodiments, the basic solution may further include other alkaline agents, such as potassium hydroxide, calcium hydroxide, or magnesium hydroxide, either singly or in combination with sodium hydroxide, to modulate the mineral composition, morphology, or growth kinetics of the precipitated carbonate minerals. Injection of the basic solution increases the local pH of the carbonated solution to a range of about 9.5 to 11.5, thereby facilitating enhanced carbonate nucleation and growth.

In certain embodiments, injection of the basic solution is conducted under a pressure of about 5 to 15 bar and at a temperature of about 25° C. to 50° C., depending on the depth, porosity, and permeability of the geological formation.

In one embodiment, the precipitation process results in the formation of fine carbonate minerals, including calcite and halite having an average particle size ranging from about 100 nm to 10 μm. The particles exhibit interconnected or porous microstructures that promote subsequent mineral carbonation and improve the filtration performance of the treated water.

In another embodiment, the interconnected microstructures of the precipitated carbonate particles are characterized by a network of calcite and halite phases, forming a matrix that enhances mechanical stability and $CO_2$ sequestration capacity in the solid phase.

In yet another embodiment, the treated water obtained after precipitation exhibits a residual total dissolved solids (TDS) concentration of less than about 1000 mg/L, making it suitable for reuse in agricultural or industrial applications.

In some embodiments, when the concentration of HDMA in the injected solution is 0.3 wt. %, the treated water exhibits a zeta potential over a limestone rock in the range of −5 to −1 mV, preferably −4 to −1 mV, more preferably −4 mV, a zeta potential over oil in the range of −30 to −25 mV, preferably −28 to −25 mV, more preferably −25.1 mV and an interfacial tension between 6.0 and 6.5 mN/m, more preferably 6.2 mN/m. Such interfacial properties indicate strong electrostatic stabilization and enhanced wettability alteration, which favors oil detachment from rock surfaces.

In some embodiments, when the concentration of HDMA in the injected solution is 0.3 wt. %, the submerging of the underground geological formation in the treated water forms an aged underground geological formation having a water contact angle of 15° to 20°, preferably 17° to 20°, more preferably 20° and having an oil recovery rate of 40 to 50%, preferably 42 to 48%, more preferably 47.5% after 20 to 30 days, preferably 25 to 30 days.

In some embodiments, when the concentration of HDMA is 0.6 wt. %, the treated water exhibits a zeta potential over a limestone rock of −6 to −5 mV, preferably −6 to −5.5 mV, more preferably −5.7 mV, a zeta potential over oil of −15 to −10 mV, preferably −13 to −10 mV, more preferably −14.9 mV and an interfacial tension between 4.5 and 6.0 mN/m, more preferably 5.7 mN/m. The shift in zeta potential reflects moderate surface charge modification, leading to balanced mineral-oil interactions suitable for sustained oil recovery.

In some embodiments, when the concentration of HDMA in the injected solution is 0.6 wt. %, the submerging of the underground geological formation in the treated water forms an aged underground geological formation having a water contact angle of 25° to 35°, preferably 27° to 35°, more preferably 28° and having an oil recovery rate of 45 to 50%, preferably 46 to 50%, more preferably 48.9% after 20 to 30 days, preferably 25 to 30 days.

In some embodiments, when the concentration of HDMA is 1.0 wt. %, the treated water exhibits a zeta potential over a limestone rock of −0.5 to −0.1 mV, preferably −0.3 to −0.1 mV, more preferably −0.35 mV, a zeta potential over oil of −10 to −5 mV, preferably −10 to −6 mV, more preferably −8.5 mV and an interfacial tension between 3.5 and 5.0 mN/m, more preferably 4.6 mN/m. These values indicate reduced electrostatic repulsion and increased hydrophobicity, resulting in lower $CO_2$ absorption efficiency but improved mineral particle aggregation and stability within the formation.

In some embodiments, when the concentration of HDMA in the injected solution is 1.0 wt. %, the submerging of the underground geological formation in the treated water forms an aged underground geological formation having a water contact angle of 40° to 50°, preferably 42° to 45°, more preferably 43° and having an oil recovery rate of 35 to 40%, preferably 37 to 40%, more preferably 37.8% after 20 to 30 days, preferably 25 to 30 days.

The variation of zeta potential and interfacial tension with HDMA concentration indicates that a concentration of about 0.3 to 0.6 wt. % provides an optimal balance between $CO_2$ absorption, carbonate mineral formation, and oil mobilization efficiency.

At step 58, the method 50 includes flooding the underground geological formation with the treated water under ambient pressure conditions. The treated water, obtained following carbonate mineral precipitation, is injected through the wellbore into the formation that further includes crude oil. The treated water functions as a displacement fluid, advancing through the pore network of the basaltic reservoir and promoting mobilization of residual oil trapped within the rock matrix. The flooding operation may be performed in a continuous or cyclic mode, depending on the permeability and pressure characteristics of the formation.

Submerging the underground geological formation in the treated water forms an aged underground geological formation exhibiting a water contact angle in the range of 20° to 25°, indicative of enhanced hydrophilicity and improved wettability of the rock surface. The reduction in contact angle transforms the rock surface from an oil-wet or mixed-wet state to a strongly water-wet condition, thereby facilitating more effective crude oil displacement. During this stage, the mineral-laden treated water also contributes to stabilizing the rock structure and enhancing in situ sequestration of $CO_2$ in solid mineral form.

At step 60, the method 50 includes extracting the crude oil from the underground geological formation. The mobilized crude oil is recovered through a production well, either the same wellbore used for injection or an adjacent one, depending on the reservoir configuration. The produced fluid stream may include a mixture of crude oil, treated water, and trace quantities of mineral particles, which can be separated at the surface using standard oil-water separation and filtration systems. The recovered oil exhibits reduced viscosity and improved flowability, indicative of successful wettability alteration and interfacial tension reduction achieved by the HDMA-modified treated water.

In some embodiments, the flooding and extraction steps may be repeated in multiple cycles to maximize recovery efficiency while maintaining mineralization and carbon sequestration performance within the formation.

The following examples are provided solely for illustration and are not to be construed as limitations of the present disclosure, as many variations thereof are possible without departing from the spirit and scope of the present disclosure.

EXAMPLES

The following examples demonstrate a method of concurrent oil extraction and carbon dioxide ($CO_2$) mineralization. The examples are provided solely for illustration and are not to be construed as limitations of the present disclosure, as many variations thereof are possible without departing from the spirit and scope of the present disclosure.

Example 1: Material and Methodology

HMDA is a linear aliphatic diamine featuring two primary amine groups (FIG. 2 for the chemical structure), which enable it to act as a nucleophilic agent and a potential chemical promoter in $CO_2$ capture and mineralization processes. Its ability to interact with dissolved $CO_2$ to form carbamate or bicarbonate species makes it particularly attractive for facilitating mineral precipitation in alkaline environments. In the present study, HMDA is employed to enhance $CO_2$ reactivity in modified sea water systems designed for dual purposes: carbon mineralization and EOR. Three concentrations of HMDA, viz. 0.3 wt. %, 0.6 wt. %, and 1.0 wt. %, have been systematically investigated to assess their influence on $CO_2$ interaction and mineral formation.

The nomenclature (Table 1) adopted for this application reflects the progressive modification of standard sea water (SW). When HMDA is added and the solution is carbonated with $CO_2$, the resulting formulations are labeled as CSW-03H, CSW-06H, and CSW-10H for the respective HMDA concentrations. Further alkalinization is achieved by introducing 1.2 wt. % NaOH into these carbonated solutions, which shifts the pH and promotes the precipitation of mineral carbonates. These fully treated formulations are designated as SSW-03H, SSW-06H, and SSW-10H, corresponding to "smart sea water" systems enriched with HMDA, $CO_2$, and NaOH. An additional formulation, labeled SSW, includes only $CO_2$ and NaOH in SW, without HMDA, serving as a comparative baseline. The sequential addition of $CO_2$ followed by NaOH initiates carbonate precipitation through the formation of bicarbonate and carbonate ions, which react with naturally occurring cations (e.g., $Ca^{2+}$, $Mg^{2+}$) in seawater. This not only enables mineralization of $CO_2$ but also reduces the ionic strength of the solution, creating a potentially low-salinity, chemically favorable fluid for EOR applications.

TABLE 1

| Nomenclature for all water formulations used in study | |
| --- | --- |
| Used water formulations | Nomenclature |
| Sea water | SW |
| SW + 0.3 wt. % HMDA + $CO_2$ | CSW-03H |
| SW + 0.6 wt. % HMDA + $CO_2$ | CSW-06H |
| SW + 1.0 wt. % HMDA + $CO_2$ | CSW-10H |
| SW + 0.3 wt. % HMDA + $CO_2$ + 1.2 wt. % NaOH | SSW-03H |
| SW + 0.6 wt. % HMDA + $CO_2$ + 1.2 wt. % NaOH | SSW-06H |
| SW + 1.0 wt. % HMDA + $CO_2$ + 1.2 wt. % NaOH | SSW-10H |
| SW + $CO_2$ + 1.2 wt. % NaOH | SSW |

A comprehensive suite of experimental techniques was employed to evaluate the interfacial and wettability characteristics of Indiana limestone in the presence of various treated fluids [See: Alyousef, M. H., et al., *Synergy of CO2*

*mineralization in produced water with enhanced oil recovery: An experimental study, Fuel*, 382, 2025, 133694, which is incorporated by reference in its entirety]. Interfacial tension (IFT) was measured using a KRUSS Spinning Drop Tensiometer at 4000 RPM and 25° C., where droplet deformation under centrifugal force enabled IFT calculation via the Young-Laplace equation. Contact angle (CA) analysis was conducted with a KRUSS Drop Shape Analyzer, using cleaned and oil-aged limestone discs to assess wettability changes through high-resolution droplet imaging. Zeta potential (ZP) measurements were carried out using the Anton Paar LiteSizer DLS 100 on limestone suspensions and emulsions to determine electrokinetic behavior and fluid-rock interactions. Additionally, spontaneous imbibition tests using the Amott-cell method provided long-term fluid uptake data over 27 days, with core samples subjected to controlled aging and saturation protocols. These methods collectively offered a robust understanding of how modified water formulations influence interfacial properties and oil recovery potential. A flow diagram summarizing the experimental procedures and outcomes is provided below (FIG. 3).

TABLE 2

Composition of ions found in seawater from the Arabian Gulf

| Ions present in SW | Concentration (ppm) |
| --- | --- |
| $Na^+$ | 18300 |
| $Ca^{2+}$ | 650 |
| $Mg^{2+}$ | 2110 |
| $SO_4^{2-}$ | 4290 |
| $Cl^-$ | 32200 |
| $HCO_3^-$ | 120 |
| TDS | 57670 |

A comparative evaluation of CSW and SSW formulations reveals insights into $CO_2$ capture, mineralization potential, and the subsequent alteration of water chemistry relevant to EOR. For the SSW formulations prepared with NaOH (FIG. 4), the weight of precipitation was 6.4 g/L for SSW, 13 g/L for SSW-03H, 16.29 g/L for SSW-06H, and 8.4 g/L for SSW-10H.

The highest weight of mineral precipitation observed in SSW-06H highlights 0.6 wt. % HMDA as the optimal concentration for promoting $CO_2$ mineralization upon NaOH addition. This enhanced precipitation correlates with efficient carbonate formation and substantial removal of divalent ions (such as $Ca^{2+}$, $Mg^{2+}$) from solution. The reduction in these ions significantly lowers the ionic strength of the treated brine, making it highly suitable for LSWF applications. Reduced salinity alters rock wettability in carbonate formations, often shifting surfaces from oil-wet to water-wet, thereby improving oil displacement efficiency.

The drop in precipitation at SSW-10H despite higher HMDA concentration reflects the non-linear influence of amine concentration on system chemistry, likely due to excessive complexation and buffering that inhibits solid formation. The SSW formulation without HMDA (6.4 g/L) exhibits the lowest mineral yield, highlighting that while NaOH alone can induce some carbonate formation, the addition of HMDA is important for achieving enhanced mineralization. HMDA, a diamine with high $CO_2$ affinity, promotes $CO_2$ capture [See: Gautam, A., et al., *Post-combustion CO2 absorption-desorption performance of HMDA-DMAE binary amine blend, Energy*, 296, 2024, 130982; Bai, L., et al., *Comprehensive technical analysis of CO2 absorption into the DEEA-HMDA blended amine, Chemical Engineering Science*, 280, 2023, 119025, which are incorporated by reference in its entirety] by forming soluble bicarbonate and carbamate species. Upon NaOH addition, these intermediates facilitate localized supersaturation with carbonate ions. This promotes nucleation and growth of mineral phases (e.g., $CaCO_3$, $MgCO_3$) more effectively than unaided $CO_2$-carbonated brine.

For the SSW formulations prepared with NaOH (FIG. 5), the measured pH values were 10.7 for SSW-03H, 10.77 for SSW-06H, and 10.05 for SSW-10H. A slight increase in pH for SSW-06H supports favorable precipitation conditions. In contrast, the pH in SSW-10H is suppressed, likely due to the overabundance of HMDA interacting with $CO_2$ and hydroxide ions, forming stable, soluble species and reducing free carbonate availability. This also explains the lower precipitation mass in SSW-10H, despite high $CO_2$ content.

For the CSW formulations prepared without NaOH, the total inorganic carbon (TIC) values (FIG. 6) were 1280 mg/L for CSW-03H, 1890 mg/L for CSW-06H, and 3330 mg/L for CSW-10H. TIC increases with HMDA concentration, indicating HMDA's role in enhancing $CO_2$ solubility via formation of bicarbonate and carbamate species. This dissolved $CO_2$ reservoir represents potential feedstock for mineralization when alkalinity (NaOH) is subsequently introduced. However, this also shows that not all captured $CO_2$ is mineralized unless conditions (e.g., pH, supersaturation) are adequately managed.

For the $CO_2$ uptake of the CSW formulations prepared without NaOH (FIG. 7), the values were 4.7 g/L for CSW-03H, 7.0 g/L for CSW-06H, and 12.3 g/L for CSW-10H. Uptake trends mirror TIC values, with CSW-10H absorbing the most $CO_2$. This shows that HMDA increases the aqueous $CO_2$ carrying capacity, but without NaOH-induced alkalinity, much of it remains in solution. The disconnect between uptake and precipitation highlights the importance of controlling both $CO_2$ loading and system pH for efficient mineral trapping.

The SSW-06H formulation, with its maximum precipitation and moderately high pH, leads to the most effective ion removal, resulting in treated water with reduced salinity. This aligns with the desired characteristics of low salinity water for EOR, which can enhance oil recovery by altering rock wettability, reducing residual oil saturation, and minimizing scaling or formation damage.

HMDA enhances $CO_2$ capture significantly in aqueous systems (seen in TIC and uptake data for CSW). Precipitation is optimized at intermediate HMDA concentrations (0.6 wt. %) after NaOH addition, suggesting a threshold beyond which $CO_2$ remains dissolved. pH is a critical parameter, controlled not only by NaOH addition but also modulated by HMDA-$CO_2$ interactions, influencing mineralization efficiency.

These insights show the dual role of HMDA, as a $CO_2$ solubilizing agent and an indirect regulator of precipitation, emphasizing the need to fine-tune its concentration for optimized $CO_2$ mineralization and smart water design in EOR applications.

In the limestone system (FIG. 8A), zeta potential reflects the surface charge at the solid-liquid interface [See: Jackson, M. D., et al., *Zeta potential in oil-water-carbonate systems and its impact on oil recovery during controlled salinity water-flooding, Scientific Reports*, 6, 2016, 37363; Bassioni, G., et al., *Wettability studies using zeta potential measurements, Journal of Chemistry*, 2015, 743179, which are incorporated by reference in its entirety]. In the case of limestone, a more negative ZP generally corresponds to increased electrostatic repulsion between rock surfaces and negatively charged fluid components, which can enhance wettability alteration toward water-wet conditions, crucial for oil displacement in carbonate reservoirs. SSW-06H exhibits the most negative zeta potential (−5.7 mV), indicating stronger electrostatic repulsion and potentially more favorable conditions for shifting the rock toward a water-wet state. SSW-03H (−4.0 mV) shows a moderate negative zeta potential, still within a range that supports enhanced wettability alteration. SSW-10H, on the other hand, shows a value close to neutral (−0.35 mV), indicating weakened surface charge interaction. This reduced negativity may impair the system's ability to destabilize oil-rock adhesion, thereby compromising wettability alteration. The strongest negative surface charge in SSW-06H aligns with its superior performance in precipitation and EOR-relevant salinity adjustment.

In the oil-in-water emulsion system (FIG. 8B), the zeta potential measured in oil-in-water emulsions reflects the charge at the oil-brine interface, which is important in governing oil mobility and wettability during enhanced oil recovery. According to prevailing LSWF mechanisms, a more negative oil-brine zeta potential enhances interfacial repulsion between the oil and mineral surfaces, which facilitates oil detachment and improves recovery. SSW-03H, with the most negative ZP (−25.1 mV), indicates strong electrostatic repulsion at the oil-brine interface. This condition is conducive for improving oil recovery via LSWF, particularly if the mineral-brine interface is similarly negative. SSW-06H shows a negative zeta potential (−14.9 mV), indicating strong electrostatic repulsion at the oil-brine interface, making it favorable for effective LSWF-induced incremental oil recovery. SSW-10H, with a zeta potential of −8.5 mV, lies near the electrostatic instability threshold. A less negative zeta potential at the oil-brine interface reduces repulsive forces, potentially limiting the LSWF-induced desorption of oil from rock surfaces.

Consistent with literature, injecting low salinity brines such as SSW-03H and SSW-06H, where the oil-brine zeta potential is negative, enhances the repulsive electrostatic interaction between the mineral-brine and oil-brine interfaces. This repulsion weakens adhesive forces between oil droplets and the rock surface, promoting oil release. In contrast, a less negative or positive zeta potential offers minimal EOR response.

Zeta potential measurements conducted on clean rock samples saturated with formation brine typically yield positive values. However, as the salinity of the brine decreases, regardless of temperature, these values tend to shift toward more negative levels [See: Jackson, M. D., et al., *Zeta potential in oil-water-carbonate systems and its impact on oil recovery during controlled salinity water-flooding, Scientific Reports,* 6, 2016, 37363, which is incorporated by reference in its entirety]. Upon subjecting the system to aging and wettability alteration, the surface charge characteristics evolve, with more positive zeta potential readings often indicating a positively charged oil-brine interface, and more negative values indicating a negatively charged one. Notably, when low salinity brines are injected, EOR may be observed in cases where the oil-brine interface exhibits a negative charge. Conversely, when the oil-brine zeta potential is positive, low salinity flooding tends to show little to no enhancement in recovery. These trends align with the widely supported hypothesis that the effectiveness of LSWF systems is largely driven by an increase in electrostatic repulsion between the oil-brine and mineral-brine interfaces, which promotes detachment of oil from the rock surface.

The surface charge characteristics of natural limestone are highly responsive to changes in the ionic composition of the surrounding brine. A reduction in the concentration of divalent cations such as calcium ($Ca^{2+}$) and magnesium ($Mg^{2+}$) leads to a substantial increase in the magnitude of the negative zeta potential. This is due to the diminished ability of these ions to neutralize surface charges and compress the electrical double layer, resulting in enhanced electrostatic repulsion at the mineral-fluid interface [See: Zarean, M., et al., *A comprehensive experimental and simulation study of zeta potential at carbonate-brine interface, Journal of Molecular Liquids,* 400, 2024, 124462; Maghsoudian, A., et al., *Micro and macro-scale mechanisms of $SO_4^{2-}$, $Mg^{2+}$, and $Ca^{2+}$ ions in smart waterflooding, Journal of Molecular Liquids,* 315, 2020, 113700; Alroudhan, A., et al., *Zeta potential of intact natural limestone: Impact of Ca, Mg, and $SO_4$ ions, Colloids and Surfaces A,* 493, 2016, 83-98; Mahdavi, M. S., et al., *Simultaneous effect of smart water and clay particles on asphaltene stability and emulsion phase, Scientific Reports,* 15, 2025, 3393, which are incorporated by reference in its entirety]. The effect is pronounced in intact limestone samples, where the inherent mineralogical complexity amplifies ion-surface interactions. Likewise, reducing the concentration of monovalent ions like sodium ($Na^+$) also causes the zeta potential to become more negative by lowering the ionic strength and expanding the diffuse double layer. However, the impact of divalent ion reduction is stronger than that of monovalent ions, as divalent cations exhibit a higher charge density and can form stronger specific interactions or bridging effects with the mineral surface. Therefore, removing $Ca^{2+}$ and $Mg^{2+}$ plays a more dominant role in increasing surface charge negativity and altering wettability, both for improved oil recovery during low salinity waterflooding.

For the 0.3 wt. % HMDA formulation (SSW-03H), the XRD analysis (FIG. 12A and FIG. 13A) shows a composition of 46.1% calcite and 53.9% halite. SEM analysis (FIG. 9) reveals that the sample contains porous, irregular, and globular aggregates with a rough surface texture, and the morphology indicates heterogeneous nucleation and limited crystal growth, consistent with moderate $CO_2$ absorption and mineralization. The particle size distribution (FIG. 14A) displays a narrow and symmetric trend, predominantly in the 2-8 μm range, with a sharp peak, and the PSD pattern reflects uniform particle sizes likely resulting from rapid precipitation without significant growth or agglomeration.

The nearly equal proportions of calcite and halite indicate that mineralization is actively occurring, especially for calcite, likely due to an optimal balance between dissolved $CO_2$ and ion availability. The moderate HMDA concentration enables $CO_2$ capture and conversion to solid carbonate phases but may not be sufficient for extensive halite formation. The fine and uniform particle size, coupled with rough morphologies, indicates nucleation-dominant growth dynamics. This formulation may favor reactive mineral surfaces ideal for low salinity effects in EOR.

For the 0.6 wt. % HMDA formulation (SSW-06H), XRD analysis (FIG. 12B and FIG. 13B) indicates a composition of 96.4% halite and 3.6% calcite. SEM analysis (FIG. 10) shows well-defined, faceted, and angular particles, with visible layered crystal structures and smooth, crystalline surface textures, reflecting better-organized mineral growth. The particle size distribution (FIG. 14B) presents a broad and multimodal trend, skewed toward larger particle sizes greater than 10 μm.

This formulation yields maximum precipitation mass (16.29 g/L), dominated by halite formation. HMDA at this concentration efficiently promotes $CO_2$ dissolution and ionic strength adjustment, leading to rapid supersaturation and crystallization of NaCl, overshadowing calcite formation. The high crystallinity and faceted shapes are supported by both SEM and XRD data. However, the low calcite content indicates that $CO_2$ mineral trapping is minimal, and most of the observed salinity reduction comes from halite precipitation. This system is optimal for ion removal and water softening, enhancing its role in smart water design for wettability alteration via low salinity effects.

For the 1.0 wt. % HMDA formulation (SSW-10H), XRD analysis (FIG. 12C and FIG. 13C) shows a composition of 88.6% halite and 11.4% calcite. SEM analysis (FIG. 11) indicates that the particles are largely amorphous and flocculated, with rounded and diffuse boundaries, and the absence of defined crystal faces indicates inhibited crystallization or the formation of poorly crystalline phases. The particle size distribution (FIG. 14C) displays a broad, bimodal trend, with a significant fraction of particles larger than 15 μm, and the peaks correspond to both primary particles and agglomerated clusters.

Though total precipitation (8.4 g/L) is lower than in SSW-06H, the relative proportion of calcite increases again. However, the poorly crystalline and amorphous morphology implies that HMDA at 1.0 wt. % may hinder ordered crystal growth-likely due to excessive complexation with $CO_2$ and/or cations, stabilizing ions in solution and preventing effective precipitation. This may lead to retention of ionic species in the solution and incomplete salinity reduction. The particle size heterogeneity and weak morphology indicate lower sediment stability, making this formulation less favorable for both $CO_2$ sequestration and water salinity optimization.

The combined XRD, SEM, and PSD analysis positions SSW-06H (0.6 wt. % HMDA) as the most effective formulation for ion removal and precipitation stability for low salinity EOR applications. Meanwhile, SSW-03H favors carbonate formation with finer particle control, and SSW-10H displays undesirable properties due to excess HMDA, resulting in amorphous and less stable precipitates.

The interfacial tension (IFT) measurements (FIG. 15) show that sea water (SW) has an IFT of 17.7 mN/m, while the SSW formulations exhibit significantly lower values, with SSW-03H measuring 6.2 mN/m, SSW-06H measuring 5.7 mN/m, and SSW-10H showing the lowest IFT at 4.6 mN/m.

All SSW formulations significantly reduce IFT compared to baseline SW, which is favorable for oil mobilization. The lowest IFT is achieved with SSW-10H, indicating higher interfacial activity likely due to increased HMDA content enhancing $CO_2$-derived ionic species in solution. However, while lower IFT is considered beneficial in some cases [See: Behrang, M., et al., *Effect of pH on interfacial tension reduction of oil low salinity solutions prepared by chloride-based salts, Journal of Petroleum Science and Engineering*, 205, 2021, 108840; Zhao, C., et al., *The effect of NaOH on lowering interfacial tension of oil alkylbenzene sulfonates solution, RSC Advances*, 8, 2018, 6169-6177; Bonto, M., et al., *An overview of the oil-brine interfacial behavior and a new surface complexation model, Scientific Reports*, 9, 2019, 1-16, which are incorporated by reference in its entirety], IFT alone does not guarantee improved oil recovery. It must be evaluated alongside wettability and pore-scale behavior.

The contact angle (CA) measurements (FIG. 16) show a clear reduction in wettability values from initial to final states for all formulations. Sea water (SW) decreases from 156° to 96°, while SSW-03H shows a substantial change from 151° to 20°. SSW-06H decreases from 152° to 28°, and SSW-10H shows a reduction from 149° to 43°.

All SSW formulations reduce contact angle substantially, indicating wettability alteration toward more water-wet conditions, which is favorable for EOR in oil-wet carbonates. SSW-03H achieves the greatest wettability shift (96% reduction), indicating strong surface-active interactions and good oil displacement potential [See: Rego, F. B., et al., *Wettability alteration and improved oil recovery in unconventional resources, Journal of Petroleum Science and Engineering*, 212, 2022, 110292; Bolysbek, D., et al., *Rock wettability alteration induced by the injection of various fluids: A review, Applied Sciences*, 14, 2024, 8663; Wang, S., et al., *Wettability phenomena at the CO2-brine-mineral interface: Implications for geologic carbon sequestration, Environmental Science & Technology*, 47, 2013, 234-241; Almahfood, M., et al., *Synergistic effects of nanoparticle-surfactant nanofluids in EOR applications, Journal of Petroleum Science and Engineering*, 171, 2018, 196-210; Sagbana, P. I., et al., *Carbonate reservoir wettability modification during low salinity waterflooding: A review, Petroleum*, 9, 2023, 317-330, which are incorporated by reference in its entirety]. SSW-06H shows slightly less reduction than SSW-03H but remains within a highly favorable range for enhancing capillary-driven recovery. SSW-10H yields the smallest change, aligning with the previously observed limitations in precipitation and zeta potential, indicating less effective rock-fluid modification at high HMDA concentration.

The spontaneous imbibition recovery measured using the Amott cell (FIG. 17) shows that SSW-03H achieves a final recovery of 47.5%, SSW-06H records the highest recovery at 48.9%, and SSW-10H results in a final recovery of 37.8%.

SSW-06H results in the maximum oil recovery, consistent with: (a) optimal wettability alteration; (b) significant salinity reduction and precipitation; (c) balanced zeta potential and mineral interface repulsion. SSW-03H also delivers strong recovery (47.5%) owing to excellent wettability alteration and a favorable interfacial environment, despite less total precipitation. SSW-10H, while achieving the lowest IFT, shows inferior recovery, confirming that ultra-low IFT alone cannot overcome limitations in wettability and electrostatic repulsion, particularly when HMDA concentration suppresses carbonate precipitation and alters the solution chemistry unfavorably.

SSW-06H delivers a balanced synergy between reduced salinity, sufficient mineral precipitation, optimal zeta potential, and favorable interfacial modifications—making it the best—performing smart water formulation. SSW-03H closely follows, with superior contact angle reduction and competitive recovery. SSW-10H, despite achieving the lowest IFT, shows clear signs of diminished EOR efficiency, underlining the importance of a holistic interfacial framework—not IFT alone—for designing chemically modified injection waters.

When untreated SW was used, the oil recovery was limited to only 6.7%, highlighting the minimal contribution of conventional brine. This low performance underscores the significance of ion removal via precipitation in smart water formulations, which enhances the low salinity effect [See: Gazem, A., et al., *Polymer formulations with binary biosurfactants and zinc oxide nanoparticles for enhanced oil recovery, Fuel*, 400, 2025, 135733; Gazem, A., et al., *Combined effect of silica nanoparticles and binary surfactants in enhancing oil recovery, Colloids and Surfaces A*, 702, 2024, 134980; Gazem, A., et al., *Synergistic enhancement of oil recovery using surfactants, $SiO_2$ nanoparticles, and poly-*

*mers, Petroleum,* 11, 2025, 102-112; Gazem, A., et al., *Secondary and tertiary mode of recovery in low salinity waterflooding: A comprehensive study, Brazilian Journal of Chemical Engineering,* 2024, which are incorporated by reference in its entirety] and promotes wettability alteration.

This invention systematically evaluates the effects of HMDA-assisted $CO_2$ mineralization on the physicochemical properties of SSW formulations and their implications for EOR through LSWF. The results show that the highest precipitation yield (16.29 g/L) occurs in the 0.6 wt. % HMDA formulation (SSW-06H), while precipitation decreases at 1.0 wt. % HMDA due to inhibited crystallization from excessive complexation. SEM and PSD analyses indicate that SSW-06H generates well-defined crystalline halite with larger particle sizes, SSW-03H forms fine globular calcite-rich particles, and SSW-10H produces amorphous and unstable structures, consistent with XRD data showing maximum calcite content (46.1%) in SSW-03H. Zeta potential measurements reveal that SSW-06H provides the most favorable limestone surface charge (–5.7 mV), and oil-brine zeta potentials confirm stronger repulsive interactions for SSW-03H and SSW-06H, aiding oil detachment. All SSW formulations significantly reduce IFT compared to sea water, with SSW-10H reaching the lowest value (4.6 mN/m), whereas SSW-03H demonstrates the largest contact angle change (151° to) 20°, reflecting strong wettability alteration. Spontaneous imbibition results show that SSW-06H delivers the highest oil recovery (48.9%), followed by SSW-03H (47.5%), while SSW-10H performs poorly despite its low IFT due to weak wettability and electrostatic effects. The baseline sea water recovery of 6.7% confirms that without induced precipitation and salinity reduction, the low-salinity effect remains insufficient for oil mobilization in carbonate systems, establishing SSW-06H as the most effective formulation for achieving the desired balance of $CO_2$ mineralization, wettability modification, salinity reduction, and interfacial activity.

Numerous modifications and variations of the present disclosure are possible in light of the above teachings. It is therefore to be understood that within the scope of the appended claims, the invention may be practiced otherwise than as specifically described herein.

The invention claimed is:

1. A method of concurrent oil extraction and carbon dioxide ($CO_2$) mineralization, comprising:
    injecting a solution comprising seawater and hexamethylenediamine (HMDA) into a wellbore bored in an underground geological formation comprising basalt rocks,
    wherein HMDA is present in the solution at a weight percentage of 0.1 to 1.0 wt. % based on a total weight of the solution;
    flowing a $CO_2$-containing gas into the solution to form a carbonated solution submerged in the underground geological formation, wherein the $CO_2$-containing gas comprises mainly $CO_2$;
    injecting a basic solution into the carbonated solution to precipitate a plurality of carbonate minerals and form a treated water,
    wherein the basic solution comprises sodium hydroxide at a weight percentage of 1 to 2 wt. % based on a total weight of the basic solution, and
    wherein the carbonate minerals comprise calcite and halite and are in the form of particles;

flooding the underground geological formation with the treated water under an ambient pressure, wherein the underground geological formation further comprises crude oil; thereby
    extracting the crude oil from the underground geological formation.

2. The method of claim 1, wherein the seawater comprises a total dissolved solid at a concentration of 50,000 to 80,000 ppm and a plurality of ions comprising:
    sodium ions ($Na^+$), at a concentration of 15,000 to 25,000 ppm;
    calcium ions ($Ca^{2+}$), at a concentration of 500 to 1,500 ppm;
    magnesium ions ($Mg^{2+}$), at a concentration of 2,000 to 4,000 ppm;
    sulfate ions ($SO_4^{2-}$), at a concentration of 2,000 to 5,000 ppm;
    chloride ions ($Cl^-$), at a concentration of 30,000 to 50,000 ppm; and
    bicarbonate ions ($HCO_3^-$), at a concentration of 100 to 500 ppm.

3. The method of claim 1, wherein HMDA is present in the solution at a weight percentage of 0.1 to 0.5 wt. % based on the total weight of the solution.

4. The method of claim 3, wherein the carbonated solution comprises a total inorganic carbon at an amount of 1000 to 1500 mg/L, and the carbonated solution uptakes $CO_2$ at an amount of 4.0 to 5.0 g/L.

5. The method of claim 3, wherein the carbonate minerals are precipitated in an amount of 10 to 15 grams per 1 liter of the carbonated solution, comprising:
    calcite, at a weight percentage of 45 to 65 wt. %; and
    halite, at a weight percentage of 50 to 60 wt. %, based on the total weight percentage of the carbonate minerals, and
    wherein the carbonate minerals comprise porous globular aggregates having an irregular shape and a particle size of 2 to 10 µm.

6. The method of claim 3, wherein the treated water exhibits a zeta potential over a limestone rock of –5 to –1 mV, a zeta potential over oil of –30 to –25 mV and an interfacial tension of 6.0 to 6.5 mN/m.

7. The method of claim 3, wherein the submerging of the underground geological formation in the treated water forms an aged underground geological formation having a water contact angle of 15° to 20°.

8. The method of claim 3, having an oil recovery rate of 45 to 50% after 20 to 30 days.

9. The method of claim 1, wherein HMDA is present in the solution at a weight percentage of 0.5 to 0.7 wt. % based on the total weight of the solution.

10. The method of claim 9, wherein the carbonated solution comprises a total inorganic carbon at an amount of 1500 to 2000 mg/L, and the carbonated solution uptakes $CO_2$ at an amount of 7.0 to 8.0 g/L.

11. The method of claim 9, wherein the carbonate minerals are precipitated at a weight of 15 to 20 grams per 1 liter of the carbonated solution, comprising:
    halite, at a weight percentage of 85 to 99 wt. %; and
    calcite, at a weight percentage of 1 to 5 wt. %, based on the total weight percentage of the carbonate minerals, and
    wherein the carbonate minerals comprise a faceted and angular morphology having a layered structure, wherein the particles have a bimodal size distribution with a particle size of 10 to 20 µm.

12. The method of claim 9, wherein the treated water exhibits a zeta potential over a limestone rock of −6.0 to −5.0 mV, a zeta potential over oil of −15 to −10 mV and an interfacial tension of 4.5 to 6.0 mN/m.

13. The method of claim 9, wherein the submerging of the underground geological formation in the treated water forms an aged underground geological formation having a water contact angle of 25° to 35°.

14. The method of claim 9, having an oil recovery rate of 45 to 50% after 20 to 30 days.

15. The method of claim 1, wherein HMDA is present in the solution at a weight percentage of 0.7 to 1.0 wt. % based on the total weight of the solution.

16. The method of claim 15, wherein the carbonated solution comprises a total inorganic carbon at an amount of 3000 to 4000 mg/L, and the carbonated solution uptakes $CO_2$ at an amount of 10 to 15 g/L.

17. The method of claim 15, wherein the carbonate minerals are precipitated at a weight of 7.0 to 10.0 grams per 1 liter of the carbonated solution, comprising:

halite, at a weight percentage of 75 to 95 wt. %;

calcite, at a weight percentage of 10 to 15 wt. %, based on the total weight percentage of the carbonate minerals, and wherein the carbonate minerals comprise a plurality of amorphous particles having a particle size of 15 to 50 μm.

18. The method of claim 15, wherein the treated water exhibits a zeta potential over a limestone rock of −0.5 to −0.1 mV, a zeta potential over oil of −10 to −5 mV and an interfacial tension of 3.5 to 5.0 mN/m.

19. The method of claim 15, wherein the submerging of the underground geological formation in the treated water forms an aged underground geological formation having a water contact angle of 40° to 50°.

20. The method of claim 15, having an oil recovery rate of 35 to 40% after 20 to 30 days.

* * * * *